(12) United States Patent
Kurasawa et al.

(10) Patent No.: US 9,298,328 B2
(45) Date of Patent: Mar. 29, 2016

(54) DISPLAY DEVICE WITH TOUCH DETECTION FUNCTION AND ELECTRONIC APPARATUS

(71) Applicant: Japan Display Inc., Tokyo (JP)

(72) Inventors: Hayato Kurasawa, Tokyo (JP); Koji Ishizaki, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/212,798

(22) Filed: Mar. 14, 2014

(65) Prior Publication Data

US 2014/0293158 A1 Oct. 2, 2014

(30) Foreign Application Priority Data

Mar. 27, 2013 (JP) ................... 2013-067640

(51) Int. Cl.
G02F 1/1335 (2006.01)
G06F 3/041 (2006.01)
G06F 3/045 (2006.01)
G06F 3/044 (2006.01)

(52) U.S. Cl.
CPC ....................................... *G06F 3/044* (2013.01)

(58) Field of Classification Search
CPC .............................. G06F 3/044; G02F 1/13338
USPC ..................................... 349/12; 345/173–174
See application file for complete search history.

(56) References Cited

U.S. PATENT DOCUMENTS 9,052,766 B2 * 6/2015 Dunphy et al. ................... 1/1
2009/0273577 A1 * 11/2009 Chen et al. .................... 345/174

| 2010/0182273 | A1 | 7/2010 | Noguchi et al. |
| 2012/0182258 | A1 | 7/2012 | Kubo et al. |
| 2012/0242606 | A1 * | 9/2012 | Mackey ......................... 345/173 |
| 2013/0294037 | A1 * | 11/2013 | Kuriki et al. .................. 361/748 |

FOREIGN PATENT DOCUMENTS

| JP | 2010-197576 | 9/2010 |
| JP | 2012-079238 | 4/2012 |
| JP | 2012-163951 | 8/2012 |

(Continued)

OTHER PUBLICATIONS

Office Action issued in connection with Taiwan Patent Application No. 103107769, dated Jun. 10, 2015.

Office Action issued in connection with Japanese Patent Application No. 2013-067640, dated Aug. 4, 2015. (7 pages).

(Continued)

*Primary Examiner* — Nathanael R Briggs

(74) *Attorney, Agent, or Firm* — K&L Gates LLP

(57) ABSTRACT

According to an aspect, a display device with a touch detection function includes a display area and a touch detection electrode that includes thin wire segments having first and second ends. Thin wire segments include a thin wire segment extending in a direction different from a pixel arrangement direction in which color regions having the highest human visibility are arranged. The second end is located away from the first end in a direction toward a target position that is distant from the first end in a pixel orthogonal direction by N times of a maximum length of one of the pixels in the pixel orthogonal direction, and in the pixel arrangement direction by M times of a maximum length of one of the pixels in the pixel arrangement direction. Each of N and M is an integer of 2 or larger. N and M are different from each other.

8 Claims, 21 Drawing Sheets

(56) References Cited

FOREIGN PATENT DOCUMENTS

| | | |
|---|---|---|
| JP | 2013-054618 | 3/2013 |
| TW | 201001010 | 1/2010 |

OTHER PUBLICATIONS

Japanese Office Action issued Oct. 27, 2015 in connection with Japanese Patent Application No. 2013-067640 (7 pages).

* cited by examiner

FIG.15

| EVALUATION EXAMPLE | FIRST END | TARGET POSITION | x | y | MOIRE EVALUATION |
|---|---|---|---|---|---|
| EVALUATION EXAMPLE 1 | P00 | P01 | 0 | 1 | D |
| EVALUATION EXAMPLE 2 | P00 | P15 | 1 | 5 | D |
| EVALUATION EXAMPLE 3 | P00 | P14 | 1 | 4 | D |
| EVALUATION EXAMPLE 4 | P00 | P13 | 1 | 3 | D |
| EVALUATION EXAMPLE 5 | P00 | P12 | 1 | 2 | D |
| EVALUATION EXAMPLE 6 | P00 | P35 | 3 | 5 | B |
| EVALUATION EXAMPLE 7 | P00 | P23 | 2 | 3 | C |
| EVALUATION EXAMPLE 8 | P00 | P34 | 3 | 4 | A |
| EVALUATION EXAMPLE 9 | P00 | P45 | 4 | 5 | A |
| EVALUATION EXAMPLE 10 | P00 | P56 | 5 | 6 | A |
| EVALUATION EXAMPLE 11 | P00 | P11 | 1 | 1 | D |
| EVALUATION EXAMPLE 12 | P00 | P65 | 6 | 5 | A |
| EVALUATION EXAMPLE 13 | P00 | P54 | 5 | 4 | A |
| EVALUATION EXAMPLE 14 | P00 | P43 | 4 | 3 | A |
| EVALUATION EXAMPLE 15 | P00 | P32 | 3 | 2 | C |
| EVALUATION EXAMPLE 16 | P00 | P53 | 5 | 3 | B |
| EVALUATION EXAMPLE 17 | P00 | P21 | 2 | 1 | D |
| EVALUATION EXAMPLE 18 | P00 | P31 | 3 | 1 | D |
| EVALUATION EXAMPLE 19 | P00 | P41 | 4 | 1 | D |
| EVALUATION EXAMPLE 20 | P00 | P51 | 5 | 1 | D |
| EVALUATION EXAMPLE 21 | P00 | P10 | 1 | 0 | D |

FIG.17

| EVALUATION EXAMPLE | FIRST END | TARGET POSITION | x | y | MOIRE EVALUATION |
|---|---|---|---|---|---|
| EVALUATION EXAMPLE 22 | Q00 | Q01 | 0 | 1 | D |
| EVALUATION EXAMPLE 23 | Q00 | Q15 | 1 | 5 | D |
| EVALUATION EXAMPLE 24 | Q00 | Q14 | 1 | 4 | D |
| EVALUATION EXAMPLE 25 | Q00 | Q13 | 1 | 3 | D |
| EVALUATION EXAMPLE 26 | Q00 | Q12 | 1 | 2 | D |
| EVALUATION EXAMPLE 27 | Q00 | Q35 | 3 | 5 | B |
| EVALUATION EXAMPLE 28 | Q00 | Q23 | 2 | 3 | C |
| EVALUATION EXAMPLE 29 | Q00 | Q34 | 3 | 4 | A |
| EVALUATION EXAMPLE 30 | Q00 | Q45 | 4 | 5 | A |
| EVALUATION EXAMPLE 31 | Q00 | Q56 | 5 | 6 | A |
| EVALUATION EXAMPLE 32 | Q00 | Q11 | 1 | 1 | D |
| EVALUATION EXAMPLE 33 | Q00 | Q65 | 6 | 5 | A |
| EVALUATION EXAMPLE 34 | Q00 | Q54 | 5 | 4 | A |
| EVALUATION EXAMPLE 35 | Q00 | Q43 | 4 | 3 | A |
| EVALUATION EXAMPLE 36 | Q00 | Q32 | 3 | 2 | C |
| EVALUATION EXAMPLE 37 | Q00 | Q53 | 5 | 3 | B |
| EVALUATION EXAMPLE 38 | Q00 | Q21 | 2 | 1 | D |
| EVALUATION EXAMPLE 39 | Q00 | Q31 | 3 | 1 | D |
| EVALUATION EXAMPLE 40 | Q00 | Q41 | 4 | 1 | D |
| EVALUATION EXAMPLE 41 | Q00 | Q51 | 5 | 1 | D |
| EVALUATION EXAMPLE 42 | Q00 | Q10 | 1 | 0 | D |

512 FILTER GLASS
510 VIDEO DISPLAY SCREEN UNIT
511 FRONT PANEL

SHUTTER BUTTON 524
LIGHT-EMITTING UNIT 521

DISPLAY UNIT 522
SHUTTER BUTTON 524
523 MENU SWITCH

UPPER HOUSING 551

552 LOWER HOUSING

552 LOWER HOUSING

551 UPPER HOUSING

LOWER HOUSING 552

553 CONNECTION UNIT

551 UPPER HOUSING

UPPER HOUSING 551

552 LOWER HOUSING

DISPLAY DEVICE WITH TOUCH DETECTION FUNCTION AND ELECTRONIC APPARATUS

CROSS REFERENCES TO RELATED APPLICATIONS

The present application claims priority to Japanese Priority Patent Application JP 2013-067640 filed in the Japan Patent Office on Mar. 27, 2013, the entire content of which is hereby incorporated by reference.

BACKGROUND

1. Technical Field

The present disclosure relates to a display device and an electronic apparatus that are capable of detecting an external proximity object, and particularly to a display device with a touch detection function and an electronic apparatus that are capable of detecting an external proximity object based on a change in electrostatic capacitance.

2. Description of the Related Art

In recent years, a touch detection device commonly called a touch panel that can detect an external proximity object has attracted attention. The touch panel is mounted on or integrated with a display device, such as a liquid crystal display device, and is used in a display device with a touch detection function. The display device with the touch detection function displays various button images, for example, on the display device so as to allow information input by using the touch panel as a substitute for typical mechanical buttons. The display device with the touch detection function having the touch panel as described above does not need an input device, such as a keyboard, a mouse, and a keypad, and thus tends to be more widely used also in a computer, a portable information terminal, such as a mobile phone, and so on.

Several types of the touch detection device exist, such as an optical type, a resistance type, and an electrostatic capacitance type. Using the electrostatic capacitance type touch detection device in the portable information terminal, for example, can achieve apparatuses that have a relatively simple structure and consume low power. For example, Japanese Patent Application Laid-open Publication No. 2010-197576 (JP-A-2010-197576) discloses a touch panel in which a translucent electrode pattern is made invisible.

The display device with the touch detection function is further required to have lower-resistance touch detection electrodes to achieve a smaller thickness, a larger screen size, or a higher definition. A translucent conductive oxide such as indium tin oxide (ITO) is used as a material of translucent electrodes for the touch detection electrodes. An electrically conductive material such as a metallic material is effectively used for reducing the resistance of the touch detection electrodes. However, using the electrically conductive material such as a metallic material can cause a moire pattern to be seen due to interference between pixels of the display device and the electrically conductive material such as a metallic material.

For the foregoing reasons, there is a need for a display device with a touch detection function and an electronic apparatus that can reduce the possibility of a moire pattern being seen, while including touch detection electrodes of an electrically conductive material such as a metallic material.

SUMMARY

According to an aspect, a display device with a touch detection function includes: a substrate; a display area in which pixels each constituted by a plurality of color regions are arranged in a matrix in a plane parallel to a surface of the substrate; a touch detection electrode that includes a conductive thin wire extending in a plane parallel to the surface of the substrate, the conductive thin wire including a plurality of thin wire segments each having a linear shape and including a first end and a second end, the second end of one of adjacent thin wire segments and the first end of the other of the adjacent thin wire segments being connected to each other; a drive electrode that has electrostatic capacitance with respect to the touch detection electrode; and a display function layer having a function of displaying an image in the display area. When it is assumed that a direction of arrangement of color regions having the highest human visibility among the color regions is defined as a pixel arrangement direction, that a maximum length of one of the pixels in a pixel orthogonal direction orthogonal to the pixel arrangement direction in the plane parallel to the surface of the substrate is defined as a first unit length, and that a maximum length of one of the pixels in a direction parallel to the pixel arrangement direction is defined as a second unit length, the plurality of thin wire segments included in the conductive thin wire includes a thin wire segment extending in a direction different from the pixel arrangement direction, and the second end of the thin wire segment is located at a place away from the first end in a direction toward a target position, where the target position is distant from the first end of the thin wire segment in the pixel orthogonal direction by N times of the first unit length, and is distant from the first end of the thin wire segment in the pixel arrangement direction by M times of the second unit length, each of N and M is an integer of 2 or larger, and N and M are different from each other.

According to another aspect, an electronic apparatus includes a display device with a touch detection function that includes: a substrate; a display area in which pixels each constituted by a plurality of color regions are arranged in a matrix in a plane parallel to a surface of the substrate; a touch detection electrode that includes a conductive thin wire extending in a plane parallel to the surface of the substrate, the conductive thin wire including a plurality of thin wire segments each having a linear shape and including a first end and a second end, the second end of one of adjacent thin wire segments and the first end of the other of the adjacent thin wire segments being connected to each other; a drive electrode that has electrostatic capacitance with respect to the touch detection electrode; and a display function layer having a function of displaying an image in the display area. When it is assumed that a direction of arrangement of color regions having the highest human visibility among the color regions is defined as a pixel arrangement direction, that a maximum length of one of the pixels in a pixel orthogonal direction orthogonal to the pixel arrangement direction in the plane parallel to the surface of the substrate is defined as a first unit length, and that a maximum length of one of the pixels in a direction parallel to the pixel arrangement direction is defined as a second unit length, the plurality of thin wire segments included in the conductive thin wire includes a thin wire segment extending in a direction different from the pixel arrangement direction, and the second end of the thin wire segment is located at a place away from the first end in a direction toward a target position, where the target position is distant from the first end of the thin wire segment in the pixel orthogonal direction by N times of the first unit length, and is distant from the first end of the thin wire segment in the pixel arrangement direction by M times of the second unit length, each of N and M is an integer of 2 or larger, and N and M are different from each other.

BRIEF DESCRIPTION OF THE FIGURES

FIG. 15 is a chart illustrating moire evaluations for the display device with the touch detection function according to the first embodiment;

FIG. 17 is a chart illustrating moire evaluations for a display device with a touch detection function according to the first modification of the first embodiment;

DETAILED DESCRIPTION

Embodiments for practicing the present disclosure will be described in detail with reference to the accompanying drawings. The description of the embodiments below will not limit the present disclosure. The constituent elements described below include elements that can easily be envisaged by those skilled in the art and substantially identical elements. The constituent elements described below can also be combined as appropriate. The description will be made in the following order.

1. Embodiments (display device with touch detection function)
1-1. First embodiment
1-2. Second embodiment
1-3. Third embodiment
1-4. Fourth embodiment
1-5. Fifth embodiment
2. Application examples (electronic apparatuses)

Figure 1:
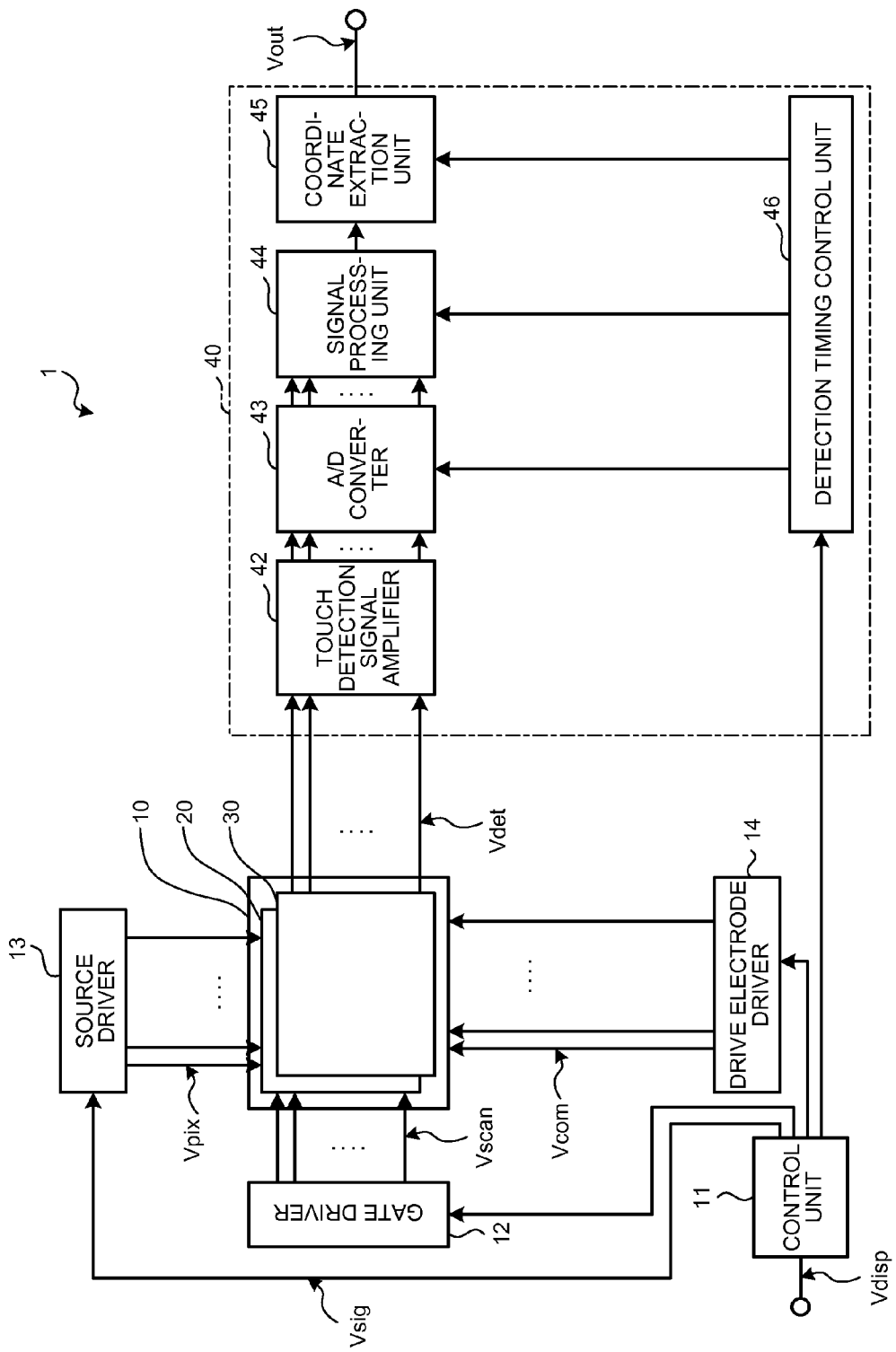
FIG. 1 is a block diagram illustrating a configuration example of a display device with a touch detection function according to a first embodiment of the present disclosure.

Examples in which a display device with a touch detection function according to the above-mentioned embodiments is applied to electronic apparatuses 3. Aspects of present disclosure 1. Embodiments 1-1. First Embodiment 1-1A. Configuration Examples
Overall Configuration Example FIG. 1 is a block diagram illustrating a configuration example of a display device with a touch detection function according to a first embodiment. This display device with a touch detection function 1 includes a display unit with a touch detection function 10, a control unit 11, a gate driver 12, a source driver 13, a drive electrode driver 14, and a touch detection unit 40. The display device with the touch detection function 1 is a display device in which the display unit with the touch detection function 10 has a built-in touch detection function. The display unit with the touch detection function 10 is a device obtained by integrating a liquid crystal display unit 20 using liquid crystal display elements as display elements with an electrostatic capacitance type touch detection device 30. The display unit with the touch detection function 10 may be a device obtained by mounting the electrostatic capacitance type touch detection device 30 on the liquid crystal display unit 20 using the liquid crystal display elements as the display elements. The liquid crystal display unit 20 may be, for example, an organic EL display device.

The liquid crystal display unit 20 is a device that performs display by sequentially scanning on each horizontal line according to a scan signal Vscan supplied from the gate driver 12, as will be described later. The control unit 11 is a circuit that supplies control signals to each of the gate driver 12, the source driver 13, the drive electrode driver 14, and the touch detection unit 40 based on an externally supplied video signal Vdisp, control signals to each of the gate driver 12, and thus controls them so as to operate in synchronization with each other.

The gate driver 12 has a function to sequentially select one horizontal line to be display-driven by the display unit with the touch detection function 10 based on the control signal supplied from the control unit 11.

The source driver 13 is a circuit that supplies pixel signals Vpix to respective sub-pixels SPix (to be described later) of the display unit with the touch detection function 10 based on the control signal supplied from the control unit 11.

The drive electrode driver 14 is a circuit that supplies a drive signal Vcom to drive electrodes COML (to be described later) of the display unit with the touch detection function 10 based on the control signal supplied from the control unit 11.

The touch detection unit 40 is a circuit that detects existence of a touch (a contact or proximity state which will be described later,) to the touch detection device 30 based on the control signal supplied from the control unit 11 and touch detection signals Vdet supplied from the touch detection device 30 of the display unit with the touch detection function 10. If a touch exists, the touch detection device 30 obtains, for example, coordinates of the touch in a touch detection region. The touch detection unit 40 includes a touch detection signal amplifier 42, an A/D converter 43, a signal processing unit 44, a coordinate extraction unit 45, and a detection timing control unit 46.

The touch detection signal amplifier 42 amplifies the touch detection signals Vdet supplied from the touch detection device 30. The touch detection signal amplifier 42 may include a low-pass analog filter that removes high-frequency components (noise components) included in the touch detection signals Vdet to extract touch components, and outputs each of the touch components.

Basic Principle of Electrostatic Capacitance Type Touch Detection

Figure 2:
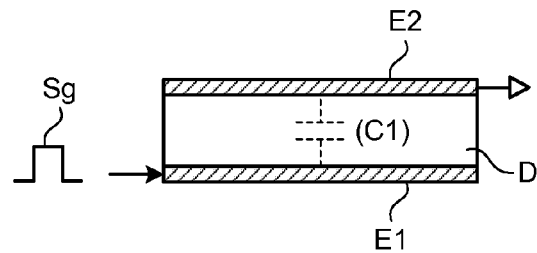
FIG. 2 is an explanatory diagram illustrating a state in which a finger is neither in contact with nor in proximity of a device for explaining a basic principle of an electrostatic capacitance type touch detection system.
Figure 3:
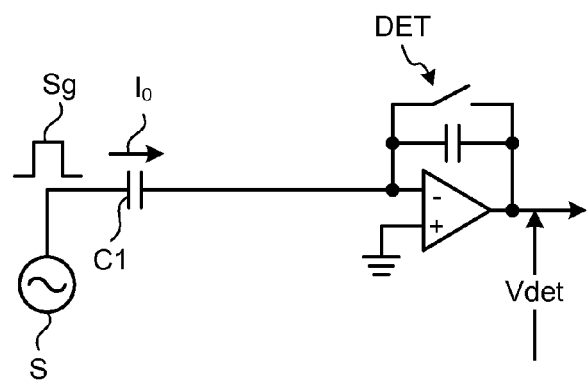
FIG. 3 is an explanatory diagram illustrating an example of an equivalent circuit in the state illustrated in FIG. 2 in which a finger is neither in contact with nor in proximity of a device.
Figure 4:
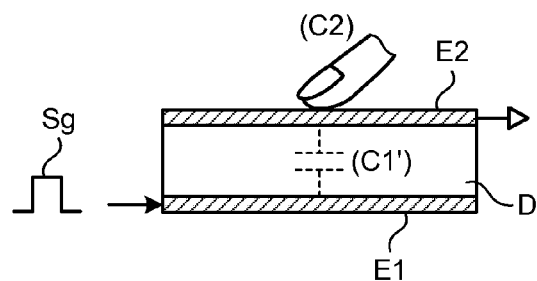
FIG. 4 is an explanatory diagram illustrating a state in which a finger is in contact with or in proximity of a device for explaining the basic principle of the electrostatic capacitance type touch detection system.
Figure 5:
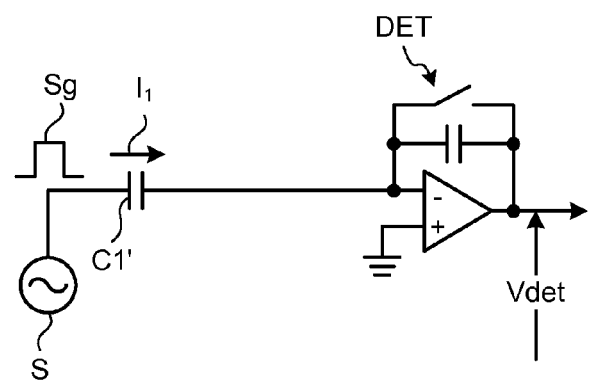
FIG. 5 is an explanatory diagram illustrating an example of the equivalent circuit in the state illustrated in FIG. 4 in which a finger is in contact with or in proximity of a device.
Figure 6:
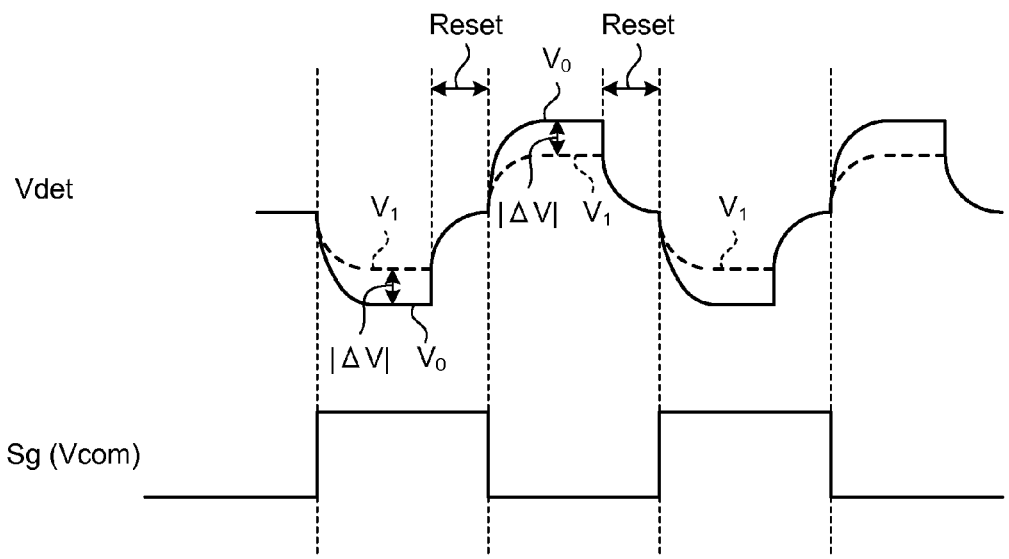
FIG. 6 is a diagram illustrating an example of waveforms of a drive signal and a touch detection signal.

The touch detection device 30 operates based on a basic principle of electrostatic capacitance type touch detection, and outputs the touch detection signals Vdet. A description will be made of the basic principle of the touch detection in the display device with the touch detection function 1 of the present embodiment with reference to FIGS. 1 to 6. FIG. 2 is an explanatory diagram illustrating a state in which a finger is neither in contact with nor in proximity of the device for explaining the basic principle of the electrostatic capacitance type touch detection system. FIG. 3 is an explanatory diagram illustrating an example of an equivalent circuit in the state illustrated in FIG. 2 in which a finger is neither in contact with nor in proximity of a device. FIG. 4 is an explanatory diagram illustrating a state in which a finger is in contact with or in proximity of a device for explaining the basic principle of the electrostatic capacitance type touch detection system. FIG. 5 is an explanatory diagram illustrating an example of the equivalent circuit in the state illustrated in FIG. 4 in which a finger is in contact with or in proximity of a device. FIG. 6 is a diagram illustrating an example of waveforms of the drive signal and the touch detection signal.

For example, as illustrated in FIGS. 2 and 4, capacitive elements C1 and C1' include each a pair of electrodes, that is, a drive electrode E1 and a touch detection electrode E2 that are arranged opposite to each other with a dielectric body D interposed therebetween. As illustrated in FIG. 3, one end of the capacitive element C1 is coupled to an alternating signal source (drive signal source) S, and the other end thereof is coupled to a voltage detector (touch detection unit) DET. The voltage detector DET is, for example, an integration circuit included in the touch detection signal amplifier 42 illustrated in FIG. 1.

Applying an alternating-current rectangular wave Sg having a predetermined frequency (such as approximately several kilohertz to several hundred kilohertz) from the alternating signal source S to the drive electrode E1 (one end of the capacitive element C1) causes an output waveform (touch detection signal Vdet) to occur via the voltage detector DET coupled to the side of the touch detection electrode E2 (the other end of the capacitive element C1). The alternating-current rectangular wave Sg corresponds to a touch drive signal Vcomt which will be described later.

In the state in which the finger is not in contact with (nor in proximity of) the device (non-contact state), a current $I_0$ corresponding to a capacitance value of the capacitive element C1 flows in association with the charge and discharge of the capacitive element C1, as illustrated in FIGS. 2 and 3. As illustrated in FIG. 6, the voltage detector DET converts a variation in the current $I_0$ corresponding to the alternating-current rectangular wave Sg into a variation in a voltage (waveform $V_0$ indicated by a solid line).

In the state in which the finger is in contact with (or in proximity of) the device (contact state), electrostatic capacitance C2 generated by the finger is in contact with or in proximity of the touch detection electrode E2, as illustrated in FIG. 4. Thus, a fringe component of the electrostatic capacitance between the drive electrode E1 and the touch detection electrode E2 is interrupted, and the capacitive element C1' having a smaller capacitance value than that of the capacitive element C1 is obtained. Referring to the equivalent circuit illustrated in FIG. 5, a current $I_1$ flows through the capacitive element C1'. As illustrated in FIG. 6, the voltage detector DET converts a variation in the current $I_1$ corresponding to the alternating-current rectangular wave Sg into a variation in a voltage (waveform $V_1$ indicated by a dotted line). In this case, the waveform $V_1$ has a smaller amplitude than that of the above-described waveform $V_0$. This indicates that an absolute value $|\Delta V|$ of a voltage difference between the waveform $V_0$ and the waveform $V_1$ changes according to an influence of an object, such as a finger, approaching from the outside. To accurately detect the absolute value $|\Delta V|$ of the voltage difference between the waveform $V_0$ and the waveform $V_1$, the voltage detector DET preferably performs an operation including a period Reset during which the charge or discharge of the capacitor is reset by switching in the circuit in accordance with the frequency of the alternating-current rectangular wave Sg.

The touch detection device 30 illustrated in FIG. 1 is configured to perform the touch detection by sequentially scanning one detection block at a time according to the drive signals Vcom (touch drive signals Vcomt to be described later) supplied from the drive electrode driver 14.

The touch detection device 30 is configured to output the touch detection signals Vdet for each detection block from a plurality of touch detection electrodes TDL (to be described later) via the voltage detectors DET illustrated in FIG. 3 or 5, and supply the touch detection signals Vdet to the touch detection signal amplifier 42 of the touch detection unit 40.

The A/D converter 43 is a circuit that samples each analog signal output from the touch detection signal amplifier 42 at a timing synchronized with the drive signals Vcom, and converts the sampled analog signal into a digital signal.

The signal processing unit 44 includes a digital filter that reduces frequency components (noise components) included in the output signals of the A/D converter 43 other than the frequency at which the drive signals Vcom have been sampled. The signal processing unit 44 is a logic circuit that detects existence of a touch to the touch detection device 30 based on the output signals of the A/D converter 43. The signal processing unit 44 performs processing to extract only a difference of voltage caused by the finger. The difference of voltage caused by the finger is the absolute value $|\Delta V|$ of the difference between the waveform $V_0$ and the waveform $V_1$ described above. The signal processing unit 44 may perform a calculation of averaging the absolute values $|\Delta V|$ per detection block to obtain an average value of the absolute values $|\Delta V|$. This allows the signal processing unit 44 to reduce the influence of the noise. The signal processing unit 44 compares the detected difference of voltage caused by the finger with a predetermined threshold voltage. The signal processing unit 44 determines that the state is the contact state of the external proximity object approaching from the outside if the difference of voltage is equal to or larger than the threshold voltage, and determines that the state is the non-contact state of the external proximity object if the difference of voltage is smaller than the threshold voltage. The touch detection unit 40 can perform the touch detection in this manner.

The coordinate extraction unit 45 is a logic circuit that obtains touch panel coordinates of a touch when the touch is detected in the signal processing unit 44. The detection timing control unit 46 performs control so as to operate the A/D converter 43, the signal processing unit 44, and the coordinate extraction unit 45 in synchronization with each other. The coordinate extraction unit 45 outputs the touch panel coordinates as a signal output Vout.

Module

Figure 7:
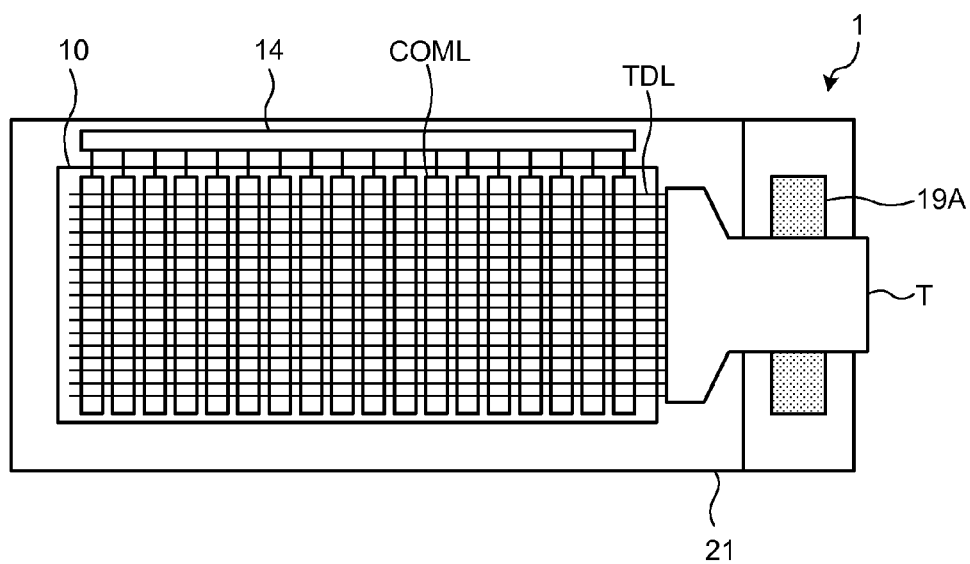
FIG. 7 is a diagram illustrating an example of a module on which the display device with the touch detection function is mounted.
Figure 8:
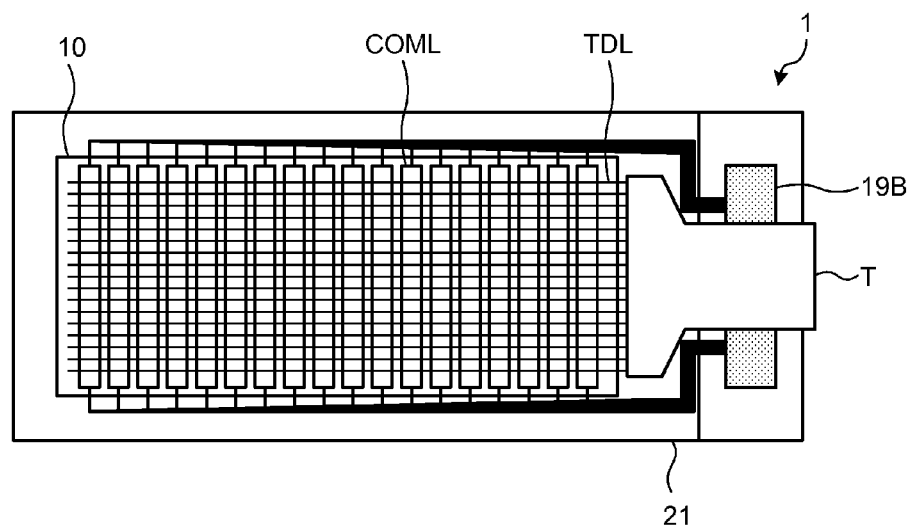
FIG. 8 is a diagram illustrating an example of a module on which the display device with the touch detection function is mounted.

FIGS. 7 and 8 are diagrams each illustrating an example of a module on which the display device with the touch detection function is mounted. When the display device with the touch detection function 1 is mounted on a module, the above-described drive electrode driver 14 may be formed on a TFT substrate 21 that is a glass substrate, as illustrated in FIG. 7.

As illustrated in FIG. 7, the display device with the touch detection function 1 includes the display unit with the touch detection function 10, the drive electrode driver 14, and a chip on glass (COG) 19A. FIG. 7 schematically illustrates the drive electrodes COML and the touch detection electrodes TDL in the display unit with a touch detection function 10 viewed in a direction orthogonal to a surface of the TFT substrate 21 to be described later. The drive electrodes COML and the touch detection electrodes TDL are formed so as to three-dimensionally intersect the drive electrodes COML. Specifically, the drive electrodes COML are formed in a direction along one side of the display unit with the touch detection function 10, and the touch detection electrodes TDL are formed in a direction along the other side of the display unit with the touch detection function 10. The output terminal of the touch detection electrodes TDL is coupled to the touch detection unit 40 mounted outside this module via a terminal unit T that is provided at the above-described other side of the display unit with the touch detection function 10 and is composed of a flexible substrate, for example. The drive electrode driver 14 is formed on the TFT substrate 21 that is a glass substrate. The COG 19A is a chip mounted on the TFT substrate 21, and includes built-in circuits necessary for a display operation, such as the control unit 11, the gate driver 12, and the source driver 13 illustrated in FIG. 1. The drive electrode driver 14 may be built into the COG of the display device with the touch detection function 1, as illustrated in FIG. 8.

As illustrated in FIG. 8, the module, on which the display device with the touch detection function 1 is mounted, includes a COG 19B. The COG 19B illustrated in FIG. 8 incorporates therein the drive electrode driver 14 in additions to the above-described circuits necessary for the display operation. In the display operation, the display device with the touch detection function 1 performs line-sequential scanning on each horizontal line, as will be described later. In a touch detection operation, the display device with the touch detection function 1 performs the line-sequential scanning on each detection line by sequentially applying the drive signals Vcom to the drive electrodes COML.

Display Unit with Touch Detection Function

Figure 9:
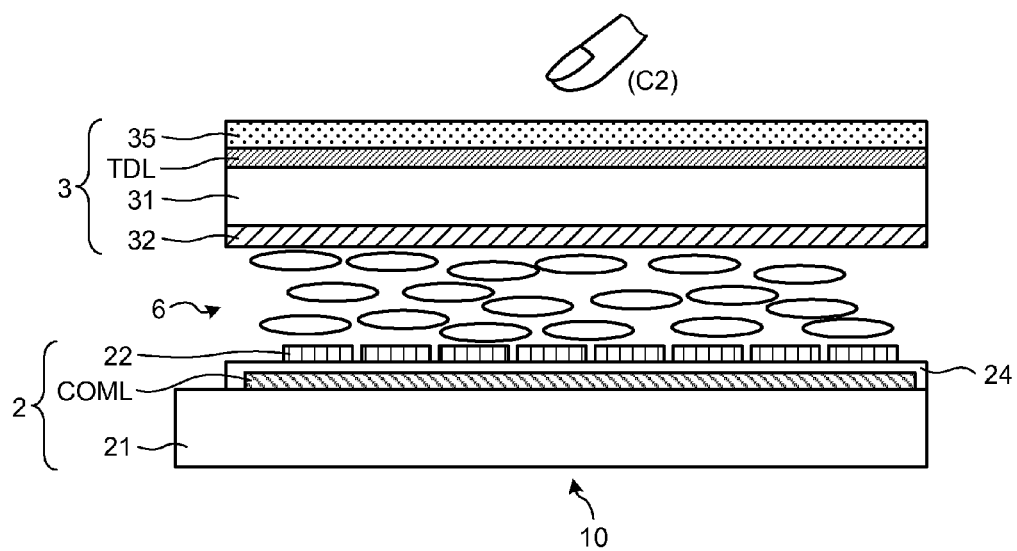
FIG. 9 is a cross-sectional view illustrating a schematic cross-sectional structure of a display unit with a touch detection function according to the first embodiment.
Figure 10:
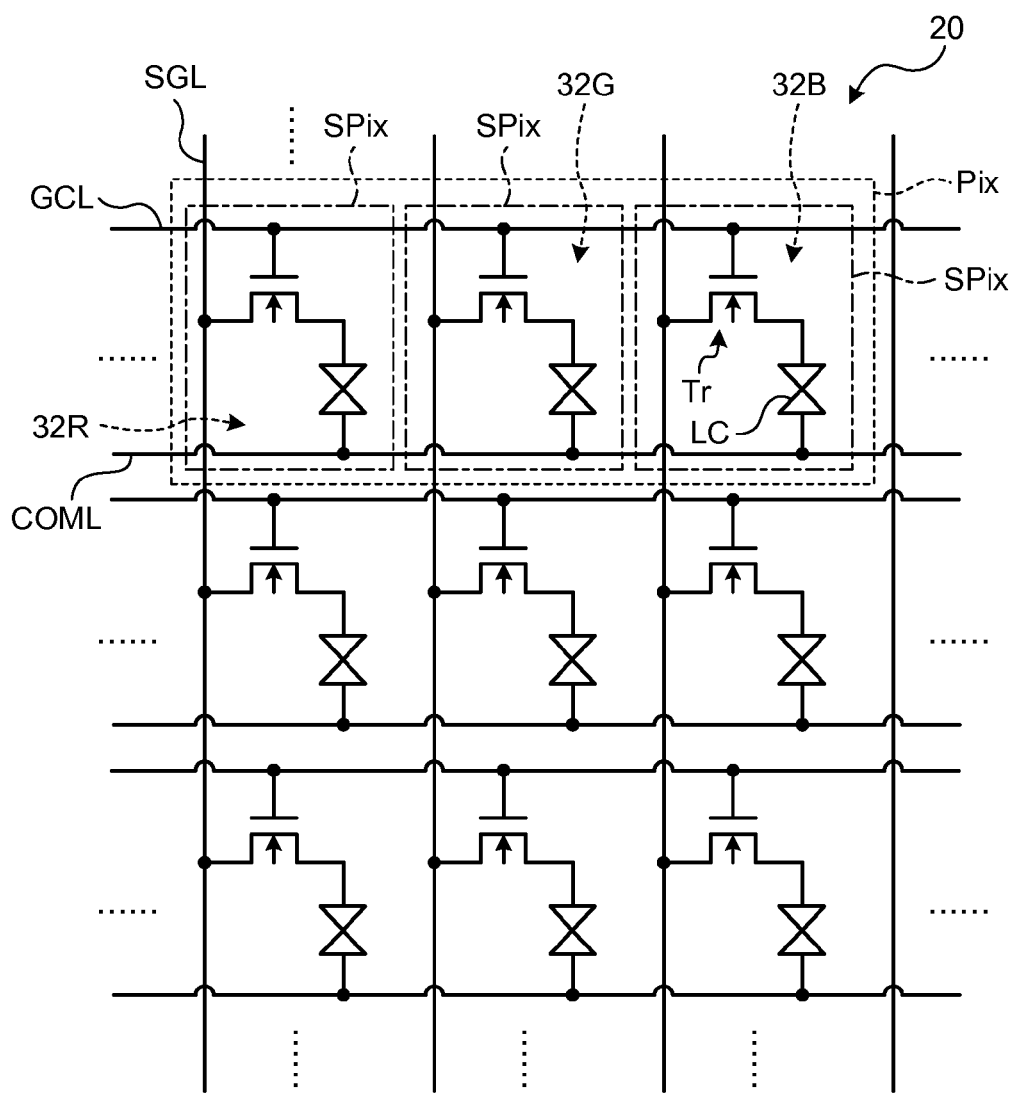
FIG. 10 is a circuit diagram illustrating a pixel arrangement of the display unit with the touch detection function according to the first embodiment.

A configuration example of the display unit with the touch detection function 10 will be described below in detail. FIG. 9 is a cross-sectional view illustrating a schematic cross-sectional structure of the display unit with the touch detection function according to the first embodiment. FIG. 10 is a circuit diagram illustrating a pixel arrangement of the display unit with the touch detection function according to the first embodiment. The display unit with the touch detection function 10 includes a pixel substrate 2, a counter substrate 3 arranged facing a surface of the pixel substrate 2 in the direction orthogonal thereto, and a liquid crystal layer 6 inserted between the pixel substrate 2 and the counter substrate 3.

The pixel substrate 2 includes the TFT substrate 21 as a circuit substrate, a plurality of pixel electrodes 22 arranged in a matrix above the TFT substrate 21, the drive electrodes COML formed between the TFT substrate 21 and the pixel electrodes 22, and an insulation layer 24 insulating the pixel electrodes 22 from the drive electrodes COML. The TFT substrate 21 is provided with thin-film transistor (TFT) elements Tr of the respective sub-pixels SPix illustrated in FIG. 10, and with wiring, including signal lines SGL that supply the pixel signals Vpix to the respective pixel electrodes 22 illustrated in FIG. 9 and scan lines GCL that drive the respective TFT elements Tr. In this manner, the signal lines SGL extend in a plane parallel to the surface of the TFT substrate 21, and supply the pixel signals Vpix for displaying an image to the pixels. The liquid crystal display unit 20 illustrated in FIG. 10 includes the sub-pixels SPix arranged in a matrix. Each of the sub-pixels SPix includes the TFT element Tr and a liquid crystal element LC. The TFT element Tr is constituted by a thin-film transistor, and in the present example, constituted by an n-channel metal oxide semiconductor (MOS) TFT. One of the source and the drain of the TFT element Tr is coupled to each of the signal lines SGL; the gate thereof is coupled to each of the scan lines GCL; and the other of the source and the drain thereof is coupled to one end of the liquid crystal element LC. One end of the liquid crystal element LC is coupled, for example, to the drain of the TFT element Tr, and the other end thereof is coupled to each of the drive electrodes COML.

The sub-pixel SPix illustrated in FIG. 10 is coupled by the scan line GCL with other sub-pixels SPix belonging to the same row of the liquid crystal display unit 20. The scan line GCL is coupled with the gate driver 12, and is supplied with the scan signal Vscan from the gate driver 12. The sub-pixel SPix is coupled with another sub-pixel SPix belonging to the same column of the liquid crystal display unit 20 via the signal line SGL. The signal line SGL is coupled with the source driver 13, and is supplied with the pixel signals Vpix from the source driver 13. The sub-pixel SPix is further coupled with another sub-pixel SPix belonging to the same row of the liquid crystal display unit 20 via the drive electrode COML. The drive electrode COML is coupled with the drive electrode driver 14, and is supplied with the drive signal Vcom from the drive electrode driver 14. This means that the sub-pixels SPix belonging to the same one of the rows share one of the drive electrodes COML, in the present example. The drive electrodes COML of the first embodiment extend parallel to the direction of extension of the scan lines GCL. The direction of extension of the drive electrodes COML of the first embodiment may be, for example, but not limited to, a direction parallel to the direction of extension of the signal lines SGL.

The gate driver 12 illustrated in FIG. 1 applies the scan signals Vscan to the gates of the TFT elements Tr of pixels Pix via the scan line GCL illustrated in FIG. 10 so as to sequentially select, as a target of display driving, one row (one horizontal line) of the sub-pixels SPix formed in a matrix on the liquid crystal display unit 20. The source driver 13 illustrated in FIG. 1 supplies the pixel signals Vpix to the respective sub-pixels SPix constituting one horizontal line sequentially selected by the gate driver 12 via the signal lines SGL illustrated in FIG. 10. The sub-pixels SPix are configured to display one horizontal line according to the pixel signals Vpix thus supplied. The drive electrode driver 14 illustrated in FIG. 1 applies the drive signals Vcom to the drive electrodes COML in each block consisting of a predetermined number of the drive electrodes COML illustrated in FIGS. 7 and 8, and thus drives the drive electrodes COML of each block.

Figure 11:
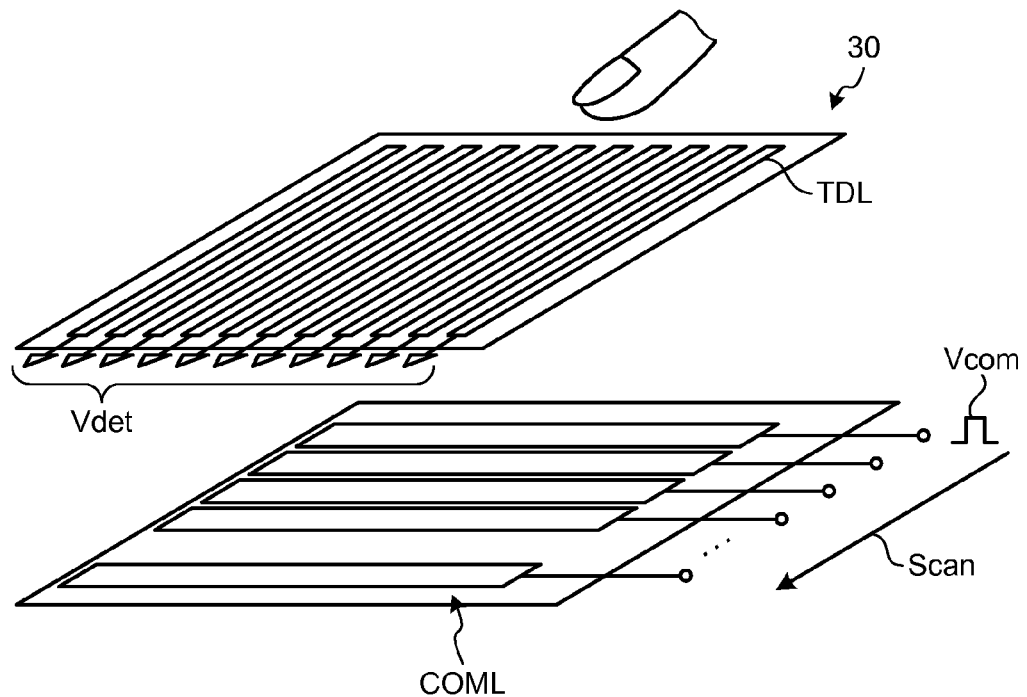
FIG. 11 is a perspective view illustrating a configuration example of drive electrodes and touch detection electrodes of the display unit with the touch detection function according to the first embodiment.

As describe above, the gate driver 12 sequentially selects a horizontal line on the liquid crystal display unit 20 by driving the scan line GCL so as to perform the line-sequential scanning in a time-division manner. The source driver 13 supplies the pixel signals Vpix to the sub-pixels SPix belonging to the horizontal line so as to perform the display on the liquid crystal display unit 20 on a horizontal line by horizontal line basis. The drive electrode driver 14 is configured to apply the drive signals Vcom to the block including the drive electrodes COML corresponding to the horizontal line while this display operation is performed, The drive electrode COML according to the present embodiment functions as a drive electrode of the liquid crystal display unit 20, and also as a drive electrode of the touch detection device 30. FIG. 11 is a perspective view illustrating a configuration example of the drive electrodes and the touch detection electrodes of the display unit with the touch detection function according to the first embodiment. As illustrated in FIG. 9, the drive electrodes COML illustrated in FIG. 11 face the pixel electrodes 22 in the direction orthogonal to the surface of the TFT substrate 21. The touch detection device 30 includes the drive electrodes COML provided at the pixel substrate 2 and the touch detection electrodes TDL provided at the counter substrate 3. The touch detection electrodes TDL include stripe-like electrode patterns extending in the direction intersecting the extending direction of the electrode patterns of the drive electrodes COML. The touch detection electrodes TDL face the drive electrodes COML in the direction orthogonal to the surface of the TFT substrate 21. Each of the electrode patterns of the touch detection electrodes TDL is coupled to an input terminal of the touch detection signal amplifier 42 of the touch detection unit 40. The electrode patterns of the drive electrodes COML and the touch detection electrodes TDL intersecting each other generate electrostatic capacitance at intersecting portions therebetween. The touch detection electrodes TDL and/or the drive electrodes COML (drive electrode blocks) are not limited to have a shape divided into a plurality of stripes. For example, the touch detection electrodes TDL and/or the drive electrodes COML (drive electrode blocks) may have a comb shape. Otherwise, in the touch detection electrodes TDL and/or the drive electrodes COML (drive electrode blocks), a plurality of patterns only need to be separated from each other. For example, the slits separating the drive electrodes COML from each other may have a straight-line shape or a curved-line shape.

When the touch detection device 30 performs the touch detection operation, this configuration causes the drive electrode driver 14 to perform driving so as to perform line-sequential scanning of the drive electrode blocks in a time-division manner. This leads to sequential selection of one detection block of the drive electrodes COML in a scan direction Scan. The touch detection device 30 outputs the touch detection signal Vdet from each of the touch detection electrodes TDL. The touch detection device 30 is configured to perform the touch detection of one detection block in this manner. This means that the drive electrode block corresponds to the drive electrode E1 whereas the touch detection electrode TDL corresponds to the touch detection electrode E2 in the above-described basic principle of touch detection, and the touch detection device 30 is configured to detect the touch according to the basic principle. As illustrated in FIG. 11, the electrode patterns intersecting each other constitute an electrostatic capacitance type touch sensor in a matrix form. This also enables detection of a position where the external proximity object is in contact therewith or in proximity thereof by scanning the entire touch detection surface of the touch detection device 30.

The liquid crystal layer 6 modulates light passing therethrough according to the state of an electric field, and includes liquid crystals of a horizontal electric field mode, such as a fringe field switching (FFS) mode or an in-plane switching (IPS) mode. An orientation film may be interposed between the liquid crystal layer 6 and the pixel substrate 2, and between the liquid crystal layer 6 and the counter substrate 3, which are illustrated in FIG. 9.

The counter substrate 3 includes a glass substrate 31 and a color filter 32 formed at one surface of the glass substrate 31. The touch detection electrodes TDL serving as detection electrodes of the touch detection device 30 are formed at the other surface of the glass substrate 31, and a polarizing plate 35 is further disposed above the touch detection electrodes TDL.

In the color filter 32 illustrated in FIG. 9, for example, color regions colored in three colors of red (R), green (G), and blue (B) are periodically arranged, and these color regions 32R, 32G, and 32B (refer to FIG. 10) of the three colors of R, G, and B correspond to the above-described respective sub-pixels SPix illustrated in FIG. 10. The color regions 32R, 32G, and 32B constitute each of the pixels Pix as a set. The pixels Pix are arranged in a matrix along directions parallel to the scan lines GCL and the signal lines SGL, and form a display area Ad to be described later. The color filter 32 faces the liquid crystal layer 6 in the direction orthogonal to the TFT substrate 21. Thus, the sub-pixels SPix can perform monochromatic display. The color filter 32 may have a combination of other colors as long as being colored in different colors from each other. The color filter 32 is not indispensable. Thus, an area not covered with the color filter 32 (i.e., translucent sub-pixels SPix) may exist.

The glass substrate 31 corresponds to a specific example of a "substrate" in the present disclosure. The color regions 32R, 32G, and 32B correspond to a specific example of "color regions" in the present disclosure. The pixel Pix corresponds to a specific example of a "pixel" in the present disclosure. The display area Ad corresponds to a specific example of a "display area" in the present disclosure. The touch detection electrode TDL corresponds to a specific example of a "touch detection electrode" in the present disclosure. The drive electrode COML corresponds to a specific example of a "drive electrode" in the present disclosure. The liquid crystal layer 6 corresponds to a specific example of a "display function layer" in the present disclosure.

1-1.B Operations and Actions

Subsequently, a description will be made of operations and actions of the display device with the touch detection function 1 of the first embodiment.

The drive signals Vcom can affect each other because the drive electrode COML functions as a common drive electrode of the liquid crystal display unit 20 and also as a drive electrode of the touch detection device 30. For this reason, the drive signals Vcom are applied to the drive electrodes COML separately in a display period B in which the display operation is performed, and in a touch detection period A in which the touch detection operation is performed. The drive electrode driver 14 applies the drive signal Vcom as a display drive signal in the display period B in which the display operation is performed. The drive electrode driver 14 applies the drive signal Vcom as a touch drive signal in the touch detection period A in which the touch detection operation is performed. The description below will describe the drive signal Vcom serving as the display drive signal as a display drive signal Vcomd, and the drive signal Vcom serving as the touch drive signal as the touch drive signal Vcomt.

Overall Operation Overview

Based on the externally supplied video signal Vdisp, the control unit 11 supplies the control signal to each of the gate driver 12, the source driver 13, the drive electrode driver 14, and the touch detection unit 40 so as to operate in synchronization with each other. In the display period B, the gate driver 12 supplies the scan signals Vscan to the liquid crystal display unit 20, and thus sequentially selects one horizontal line to be display-driven. The source driver 13 supplies the pixel signals Vpix to the respective pixels Pix constituting the horizontal line selected by the gate driver 12 in the display period B.

In the display period B, the drive electrode driver 14 applies the display drive signals Vcomd to a drive electrode block related to the horizontal line. In the touch detection period A, the drive electrode driver 14 sequentially applies the touch drive signal Vcomt to a drive electrode block related to the touch detection operation, and thus sequentially selects one detection block. In the display period B, the display unit with the touch detection function 10 performs the display operation based on the signals supplied from the gate driver 12, the source driver 13, and the drive electrode driver 14. In the touch detection period A, the display unit with the touch detection function 10 performs the touch detection operation based on the signal supplied from the drive electrode driver 14, and outputs the touch detection signal Vdet from the touch detection electrode TDL. The touch detection signal amplifier 42 amplifies and then outputs the touch detection signal Vdet. The A/D converter 43 converts the analog signal output from the touch detection signal amplifier 42 into the digital signal at a timing synchronized with the touch drive signal Vcomt. Based on the output signal of the A/D converter 43, the signal processing unit 44 detects existence of a touch to the touch detection device 30. The detection of the touch by the signal processing unit 44 leads the coordinate extraction unit 45 to obtain the touch panel coordinates of the touch.

Detailed Operation

Figure 12:
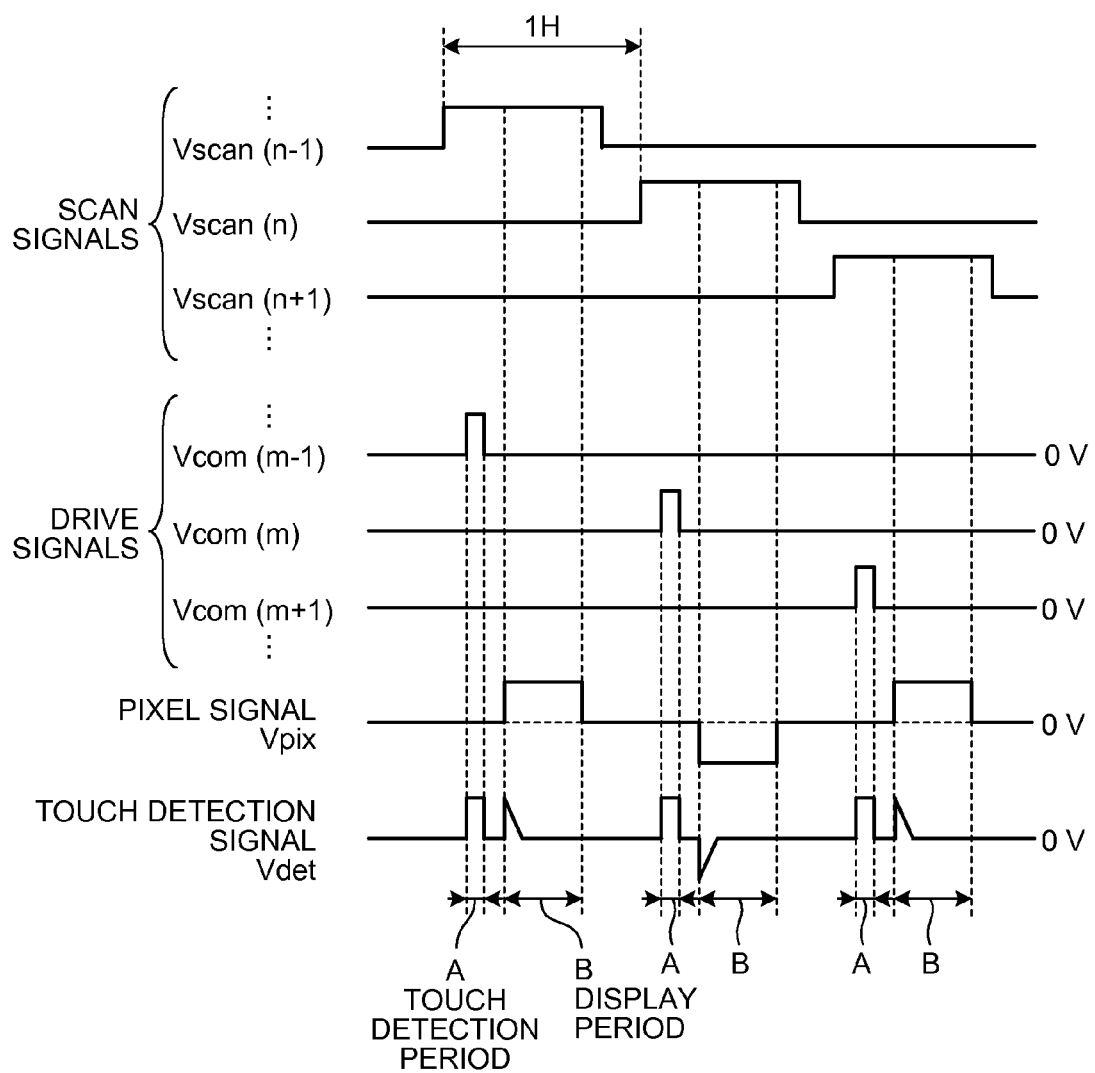
FIG. 12 is a timing waveform diagram illustrating an operation example of the display device with the touch detection function according to the first embodiment.

A detailed operation of the display device with the touch detection function 1 will be described below. FIG. 12 is a timing waveform diagram illustrating an operation example of the display device with the touch detection function according to the first embodiment. As illustrated in FIG. 12, the liquid crystal display unit 20 sequentially scan on each of horizontal lines the adjacent scan lines GCL of (n−1)th, nth, and (n+1)th rows among the scan lines GCL based on the scan signals Vscan supplied from the gate driver 12, and thus performs the display. In a similar manner, based on the control signal supplied from the control unit 11, the drive electrode driver 14 supplies the drive signal Vcom to the adjacent drive electrodes COML of (m−1)th, mth, and (m+1)th columns among the drive electrodes COML of the display unit with the touch detection function 10.

In this manner, the display device with the touch detection function 1 performs the touch detection operation (in the touch detection period A) and the display operation (in the display period B) in a time-division manner at intervals of one horizontal display period (1H). In the touch detection operation, the scanning of the touch detection is performed by selecting a different drive electrode COML and applying thereto the drive signal Vcom at intervals of one horizontal display period 1H. The operation will be described below in detail.

First, the gate driver 12 applies the scan signal Vscan to the scan line GCL of the (n−1)th row, and thus the level of a scan signal Vscan(n−1) changes from a low level to a high level. This starts one horizontal display period 1H.

Then, in the touch detection period A, the drive electrode driver 14 applies the drive signal Vcom to the drive electrode COML of the (m−1)th column, and thus the level of a drive signal Vcom(m−1) changes from a low level to a high level. The drive signal Vcom(m−1) is transmitted to the touch detection electrode TDL via the electrostatic capacitance, and thus the touch detection signal Vdet changes. Then, a change in the level of the drive signal Vcom(m−1) from the high level to the low level changes the touch detection signal Vdet in the same manner. The waveform of the touch detection signal Vdet in the touch detection period A corresponds to the touch detection signal Vdet in the above-described basic principle of touch detection. The A/D converter 43 performs the touch detection by A/D-converting the touch detection signal Vdet in the touch detection period A. This is how the display device with the touch detection function 1 performs the touch detection for one detection line.

Then, in the display period B, the source driver 13 applies the pixel signals Vpix to the signal lines SGL to perform display for one horizontal line. As illustrated in FIG. 12, the changes in the pixel signals Vpix can be transmitted to the touch detection electrode TDL via parasitic capacitance so as to change the touch detection signal Vdet. However, in the display period B, keeping the A/D converter 43 from performing the A/D conversion can suppress the influence of the changes in the pixel signals Vpix on the touch detection. After the source driver 13 finishes supplying the pixel signals Vpix, the gate driver 12 changes the level of the scan signal Vscan (n−1) of the scan line GCL of the (n−1)th row from the high level to the low level, and thus the one horizontal display period finishes.

Then, the gate driver 12 applies the scan signal Vscan to the scan line GCL of the nth row that is different from the previous one, and thus the level of a scan signal Vscan(n) changes from a low level to a high level. This starts the next one horizontal display period.

In the next touch detection period A, the drive electrode driver 14 applies the drive signal Vcom to the drive electrode COML of the mth column that is different from the previous one. Then, the A/D converter 43 A/D-converts a change in the touch detection signal Vdet, and thus the touch detection for this detection line is performed.

Then, in the display period B, the source driver 13 applies the pixel signals Vpix to the signal lines SGL to perform display for one horizontal line. The drive electrode driver 14 applies the display drive signal Vcomd as a common potential to the drive electrode COML. The potential of the display drive signal Vcomd is, for example, a low-level potential of the touch drive signal Vcomt in the touch detection period A. The display device with the touch detection function 1 of the present embodiment performs dot inversion driving, so that the pixel signals Vpix applied by the source driver 13 have a polarity opposite to that in the previous horizontal display period. After this display period B finishes, this horizontal display period 1H finishes.

From then on, the display device with the touch detection function 1 repeats the above-described operation to perform the display operation by scanning the entire display surface and also to perform the touch detection operation by scanning the entire touch detection surface.

In one horizontal display period (1H), the display device with the touch detection function 1 performs the touch detection operation during the touch detection period A and the display operation during the display period B. Performing the touch detection operation and the display operation in separate periods in this manner allows the display device with the touch detection function 1 to perform both the touch detection operation and the display operation in the same horizontal display period and to suppress the influence of the display operation on the touch detection.

Arrangement of Touch Detection Electrodes

Figure 13:
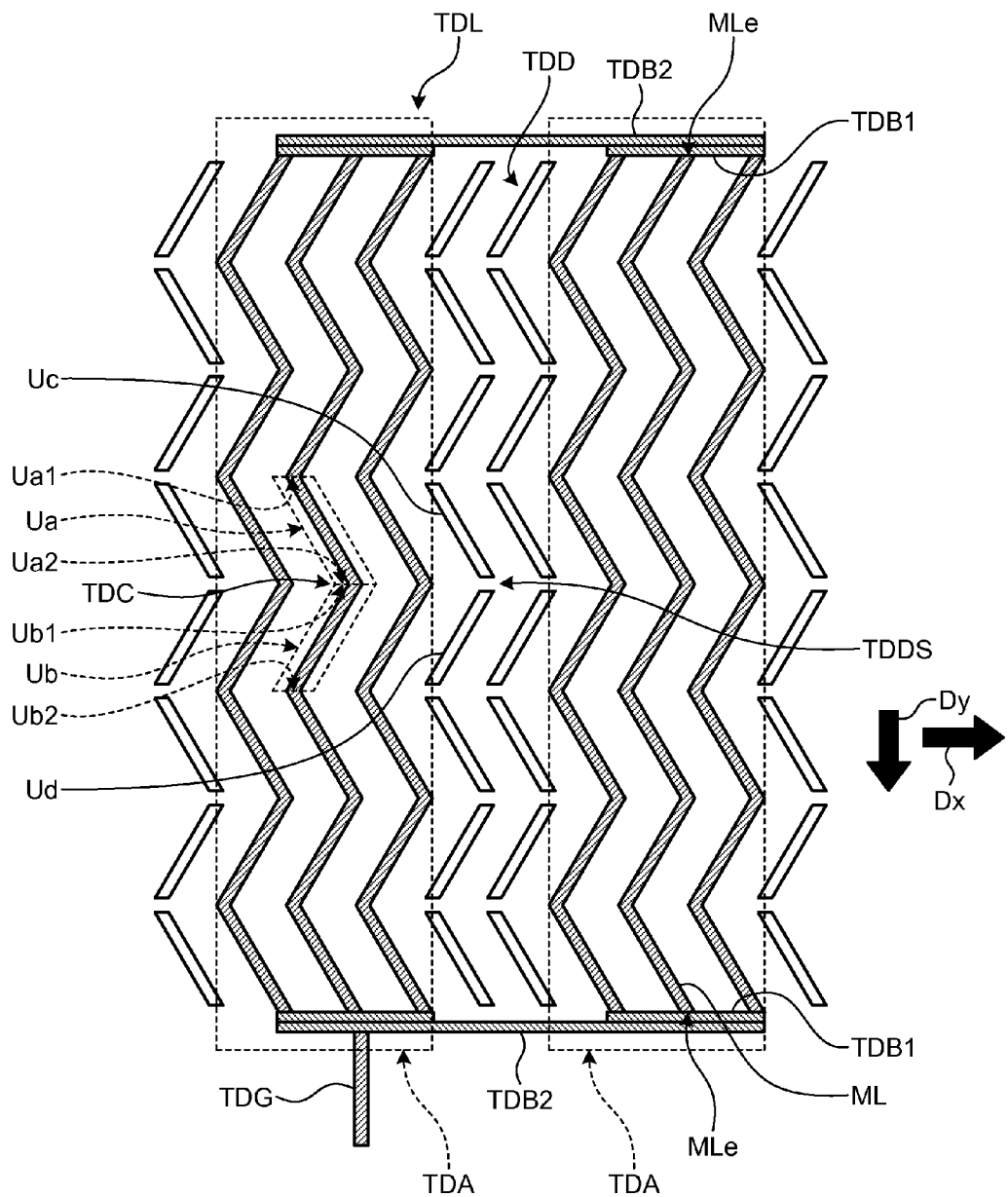
FIG. 13 is a schematic diagram illustrating an arrangement of the touch detection electrodes according to the first embodiment.
Figure 14:
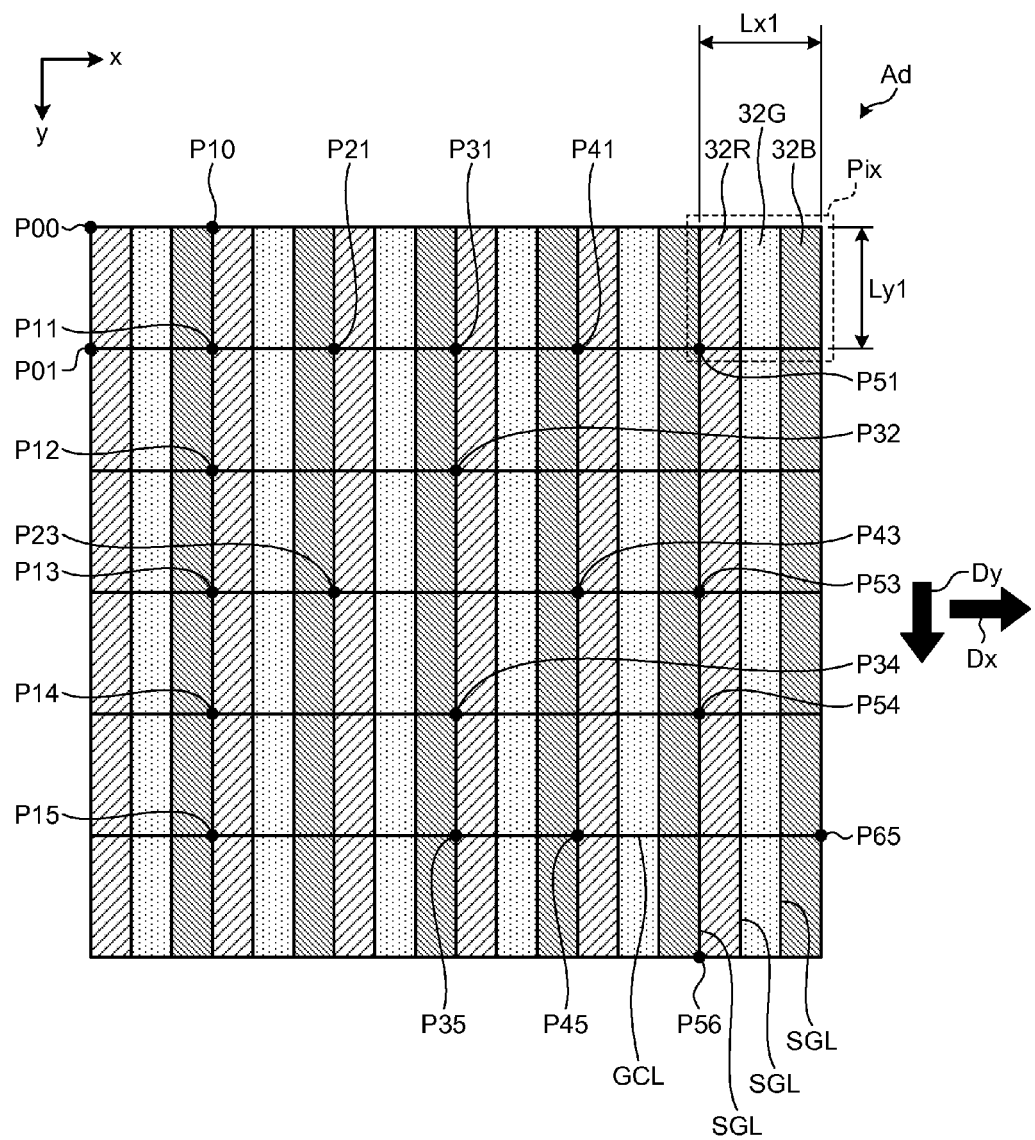
FIG. 14 is a schematic diagram explaining relative positional relations between a first end and a second end of a thin wire segment according to the first embodiment.

FIG. 13 is a schematic diagram illustrating an arrangement of the touch detection electrodes TDL according to the first embodiment. FIG. 14 is a schematic diagram explaining relative positional relations between a first end and a second end of a thin wire segment according to the first embodiment. FIG. 15 is a chart illustrating moire evaluations for the display device with the touch detection function 1 according to the first embodiment.

As illustrated in FIG. 13, the touch detection electrode TDL according to the first embodiment includes a plurality of conductive thin wires ML extending in a pixel arrangement direction Dy in a plane parallel to the counter substrate 3. The conductive thin wires ML that are coupled at ends MLe thereof with each other via first conductive portions TDB1 belong to a detection area TDA. In the detection area TDA, the conductive thin wires ML are conductive with each other and extend with a certain space between each other. More than one of the detection areas TDA extends with a certain space between each other. The first conductive portions TDB1 of the detection areas TDA are coupled to be conductive with each other via a second conductive portion TDB2. The second conductive portion TDB2 is coupled to the touch detection unit 40 illustrated in FIG. 1 via detection wiring TDG. The first conductive portions TDB1 and the second conductive portions TDB2 are formed of the same material as that of the conductive thin wires ML. The above-described configuration can reduce the number of the conductive thin wires ML, and causes the touch detection to be performed by more than one of the conductive thin wires ML for a certain area so as to be able to reduce the resistance during the touch detection.

Each of the conductive thin wires ML includes thin wire segments Ua and thin wire segments Ub. Each of the thin wire segments Ua is a pattern of electrically conductive material extending at an angle with respect to the pixel arrangement direction Dy, and includes a first end Ua1 and a second end Ua2. In a similar manner, each of the thin wire segments Ub is a pattern of electrically conductive material extending in a direction different from the direction of extension of the thin wire segment Ua, and includes a first end Ub1 and a second end Ub2. The second end Ua2 of the thin wire segment Ua and the first end Ub1 of the thin wire segment Ub are connected to each other, and thus the thin wire segments Ua and Ub are conductive with each other.

The connecting portion between the second end Ua2 of the thin wire segment Ua and the first end Ub1 of the thin wire segment Ub forms a bent portion TDC of the conductive thin wire ML. Thus, the thin wire segments Ua and Ub are bent at a predetermined angle at each bent portion TDC. For example, the thin wire segments Ua and Ub of the conductive thin wire ML according to the first embodiment have the same length. The degree of the angle between the direction of extension of the thin wire segment Ua and the pixel arrangement direction Dy is equal to the degree of the angle between the direction of extension of the thin wire segment Ub and the pixel arrangement direction Dy. The conductive thin wire ML according to the first embodiment changes the direction of bending toward a pixel orthogonal direction Dx at each bent portion TDC. The thin wire segments Ua and Ub preferably have a width in the range from 2 µm to 10 µm, inclusive. This is because a width larger than 10 µm can cause the thin wire segments Ua and Ub to be seen by a person, and a width smaller than 2 µm increases the resistance of the thin wire segments Ua and Ub.

The conductive thin wire ML of the touch detection electrode TDL is of an electrically conductive metal material, and is formed of a metal material, such as aluminum (Al), copper (Cu), silver (Ag), molybdenum (Mo), chromium (Cr), tungsten (W), or an alloy of these materials. Alternatively, the conductive thin wire ML of the touch detection electrode TDL is formed of an oxide (metal oxide) of aluminum (Al), copper (Cu), silver (Ag), molybdenum (Mo), chromium (Cr), or tungsten (W), and has electric conductivity. The conductive thin wire ML may be a patterned laminated body that has one or more layers of the above-described metal material and/or the above-described metal oxide. The conductive thin wire ML may be a patterned laminated body that has one or more layers of the metal material or the metal oxide described above, and/or a translucent conductive oxide such as ITO as a material of translucent electrodes. The conductive thin wire ML has a lower resistance than that of the translucent conductive oxide such as ITO as a material of translucent electrodes. The material of the conductive thin wire ML has a lower transmittance value than that of a material of ITO having the same film thickness. For example, the material of the conductive thin wire ML may have a transmittance value of 10% or less.

As illustrated in FIG. 13, the detection areas TDA are arranged with a certain space between each other. Areas in which the conductive thin wires ML of the touch detection electrode TDL are arranged and areas in which the conductive thin wires ML of the touch detection electrode TDL are not arranged have different levels of light-shielding effect from each other. This can cause the touch detection electrode TDL to be easily visible. Therefore, dummy electrodes TDD that are not connected to the detection wiring TDG are each arranged between the adjacent detection areas TDA at the counter substrate 3. The dummy electrodes TDD are formed of the same material as that of the conductive thin wires ML of the touch detection electrode TDL. The dummy electrodes TDD may be formed of other material, and only needs to have a level of the light-shielding effect comparable with that of the touch detection electrode TDL.

Each of the dummy electrodes TDD illustrated in FIG. 13 includes thin wire segments Uc and thin wire segments Ud. Each of the thin wire segments Uc has a size comparable with that of the thin wire segment Ua, and is arranged parallel to the direction of extension of the thin wire segment Ua. Each of the thin wire segments Ud has a size comparable with that of the thin wire segment Ub, and is arranged parallel to the direction of extension of the thin wire segment Ub. This reduces the difference in the level of the light-shielding effect between the areas arranged with the touch detection electrodes TDL and the areas not arranged therewith, and thus can reduce the possibility of the touch detection electrode TDL being seen.

The dummy electrode TDD includes, between the thin wire segments Uc and Ud, a split portion TDDS that is a slit not containing the same material as that of the conductive thin wire ML. This follows that the split portion TDDS prevents electrical conduction between the thin wire segments Uc and Ud, and thus generates a difference in capacitance from the touch detection electrode. This can reduce an influence of the dummy electrode TDD on the absolute value $|\Delta V|$ illustrated in FIG. 6 when the finger approaches both the touch detection electrode TDL and the dummy electrode TDD during the touch detection. In this manner, the split portion TDDS splits the dummy electrode TDD into portions having a smaller area than that of the conductive thin wire ML of the touch detection electrode TDL, and thereby can reduce the influence of the dummy electrode TDD on accuracy of the touch detection. In the embodiments and modifications to be described below, the descriptions about the direction of extension of the thin wire segment Ua also apply to the direction of extension of the thin wire segment Uc. The descriptions about the direction of extension of the thin wire segment Ub also apply to the direction of extension of the thin wire segment Ud.

A description will be made of the pixel arrangement direction Dy and the pixel orthogonal direction Dx illustrated in FIGS. 13 and 14. As described above, the display area Ad includes the pixels Pix, each of which includes as a set the color regions 32R, 32G, and 32B corresponding to the respective sub-pixels SPix. The pixels Pix are arranged in a matrix along the directions parallel to the scan lines GCL and the signal lines SGL. The pixels Pix are arranged so that the respective sets of the color regions 32R, 32G, and 32B are adjacent to each other with the scan line GCL interposed therebetween.

The pixel arrangement direction Dy is a direction of arrangement of color regions having the highest human visibility. The pixel orthogonal direction Dx is a direction orthogonal to the pixel arrangement direction Dy in the plane parallel to a surface of the counter substrate 3. Green (G) has the highest human visibility among the three colors of red (R), green, (G), and blue (B). The pixel arrangement direction Dy in the first embodiment is the direction parallel to the signal line SGL because the color regions 32G are arranged in the direction parallel to the signal line SGL in FIG. 14.

For explanation of the relative positional relations between the first end Ua1 of the thin wire segment Ua and the second end Ua2 of the thin wire segment Ua, xy coordinates are defined in FIG. 14 in which an arbitrary point among intersections between the scan lines GCL and the signal lines SGL is defined as a point of origin P00, and the coordinates of the point of origin P00 are represented as (0, 0). The x-axis is set in the direction parallel to the pixel orthogonal direction Dx, and the y-axis is set in the direction parallel to the pixel arrangement direction Dy. The maximum length of one of the pixels Pix in the x direction is defined as a unit length in the x direction. The maximum length of one of the pixels Pix in the y direction is defined as a unit length in the y direction. The maximum length of one of the pixels Pix in the x direction is represented as a first unit length Lx1. The maximum length of one of the pixels Pix in the y direction is represented as a second unit length Ly1.

For example, after a point moves from the point of origin P00 by the first unit length Lx1 in the x direction, and further moves by the second unit length Ly1 in the y direction, the coordinates of the point result in (1, 1). In this xy coordinate system, a point P01 is a point of coordinates (0, 1). A point P15 is a point of coordinates (1, 5). A point P14 is a point of coordinates (1, 4). A point P13 is a point of coordinates (1, 3). A point P12 is a point of coordinates (1, 2). A point P35 is a point of coordinates (3, 5). A point P23 is a point of coordinates (2, 3). A point P34 is a point of coordinates (3, 4). A point P45 is a point of coordinates (4, 5). A point P56 is a point of coordinates (5, 6). A point P11 is a point of coordinates (1, 1). A point P65 is a point of coordinates (6, 5). A point P54 is a point of coordinates (5, 4). A point P43 is a point of coordinates (4, 3). A point P32 is a point of coordinates (3, 2). A point P53 is a point of coordinates (5, 3). A point P21 is a point of coordinates (2, 1). A point P31 is a point of coordinates (3, 1). A point P41 is a point of coordinates (4, 1). A point P51 is a point of coordinates (5, 1). A point P10 is a point of coordinates (1, 0).

Evaluation Examples

Assuming that the first end Ua1 of the thin wire segment Ua is in the position of the point P00, evaluations about visibility of a moire pattern were conducted while changing the direction of positioning of the second end Ua2. The evaluation results will be described below as Evaluation Examples 1 to 21 illustrated in FIG. 15.

Evaluation Example 1

In the conductive thin wire according to Evaluation Example 1, a plurality of thin wire segments parallel to the pixel arrangement direction Dy are connected in sequence in the pixel arrangement direction Dy.

Evaluation Example 2

In the conductive thin wire according to Evaluation Example 2, the thin wire segments Ua and Ub are alternately connected in sequence. The thin wire segment Ua is arranged so that, when the first end Ua1 of the thin wire segment Ua located at the point P00, the second end Ua2 is located at a point away from the point P00 in a direction toward the point P15 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 3

In the conductive thin wire according to Evaluation Example 3, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P14 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 4

In the conductive thin wire according to Evaluation Example 4, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P13 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 5

In the conductive thin wire according to Evaluation Example 5, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P12 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 6

In the conductive thin wire according to Evaluation Example 6, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P35 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 7

In the conductive thin wire according to Evaluation Example 7, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P23 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 8

In the conductive thin wire according to Evaluation Example 8, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P34 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 9

In the conductive thin wire according to Evaluation Example 9, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P45 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 10

In the conductive thin wire according to Evaluation Example 10, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P56 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 11

In the conductive thin wire according to Evaluation Example 11, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P11 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 12

In the conductive thin wire according to Evaluation Example 12, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P65 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 13

In the conductive thin wire according to Evaluation Example 13, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P54 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 14

In the conductive thin wire according to Evaluation Example 14, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P43 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 15

In the conductive thin wire according to Evaluation Example 15, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P32 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 16

In the conductive thin wire according to Evaluation Example 16, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P53 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 17

In the conductive thin wire according to Evaluation Example 17, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P21 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 18

In the conductive thin wire according to Evaluation Example 18, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P31 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 19

In the conductive thin wire according to Evaluation Example 19, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P41 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 20

In the conductive thin wire according to Evaluation Example 20, the thin wire segments Ua and Ub are alternately connected in sequence. The thin wire segment Ua is arranged so that, when the first end Ua1 of the thin wire segment Ua is located at the point P00, the second end Ua2 is located at a point away from the point P00 in a direction toward the point P51 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 21

In the conductive thin wire according to Evaluation Example 21, a plurality of thin wire segments parallel to the pixel orthogonal direction Dx are connected in sequence in the pixel orthogonal direction Dx.

Evaluation

In the moire evaluation, the visibility for human eyes of the moire pattern formed by a display image of the display device with the touch detection function 1 corresponding to each of Evaluation Examples 1 to 21 is evaluated as four levels. The four-level criterion of the moire evaluation is as follows. The case that the moire pattern is not visible for the human eyes even at a distance of less than 30 cm from a surface of the display device with the touch detection function 1 is represented as the letter A. The case that the moire pattern is not visible for the human eyes only at a distance of 30 cm or larger from the display device with the touch detection function 1 is represented as the letter B. The case that the moire pattern is not visible for the human eyes only at a distance of 60 cm or larger from the display device with the touch detection function 1 is represented as the letter C. The case that the moire pattern is visible for the human eyes even at a distance of 60 cm or larger from the display device with the touch detection function 1 is represented as the letter D.

Evaluation Examples 6 to 10, and 12 to 16 satisfy a first condition stating as follows. The second end Ua2 of the thin wire segment Ua is located at a point away from the first end Ua1 in the direction toward the target position. The target position is distant from the first end Ua1 in the pixel orthogonal direction Dx by an integral multiple of the first unit length Lx1, a value of which is two or larger, and is distant from the first end Ua1 in the pixel arrangement direction Dy by an integral multiple of the second unit length Ly1, a value of which is two or larger. The value of the integral multiple of the first unit length Lx1 differs from the value of the integral multiple of the second unit length Ly1. In other words, the first condition is as follows. The second end Ua2 of the thin wire segment Ua is arranged away from the first end Ua1 in the direction toward the target position. The target position is distant from the first end Ua1 in the pixel orthogonal direction Dx by N times of the first unit length Lx1, and is distant from the first end Ua1 in the pixel arrangement direction Dy by M times of the second unit length Ly1. Each of N and M is an integer of 2 or larger. N and M are different from each other. The moire evaluation of the conductive thin wire ML according to the first embodiment satisfying the first condition is rated as any one of A, B, or C in any of Evaluation Examples 6 to 10, and 12 to 16, as illustrated in FIG. 15. Thus, the visibility of the moire pattern is suppressed.

Evaluation Examples 6, 8 to 10, 12 to 14, and 16 satisfy a second condition. The second condition is that the values of the integral multiples of the first and the second unit lengths Lx1 and Ly1 have a value of three or larger. In other words, the second condition is that each of N and M is an integer of 3 or larger. The moire evaluation of any of Evaluation Examples 6, 8 to 10, 12 to 14, and 16 satisfying the second condition is rated as A or B. Thus, the visibility of the moire pattern is further suppressed.

Evaluation Examples 8 to 10, and 12 to 14 satisfy a third condition. The third condition is that the difference between the values of the integral multiples of the first and the second unit lengths Lx1 and Ly1 is one. In other words, the third condition is that a difference between N and M is 1. The moire evaluation of any of Evaluation Examples 8 to 10, and 12 to 14 is rated as A. Thus, the visibility of the moire pattern is further suppressed.

Advantages

As described above, the pixels Pix are arranged in a matrix along the directions parallel to the scan lines GCL and the signal lines SGL. If the scan lines GCL and the signal lines SGL are covered with a black matrix, the black matrix keeps light from transmitting. If the scan lines GCL and the signal lines SGL are not covered with a black matrix, the scan lines GCL and the signal lines SGL keeps light from transmitting. In the first embodiment, a periodic pattern of a plurality of straight lines parallel to the pixel orthogonal direction Dx along a direction parallel to the scan lines GCL is likely to appear in the display area Ad. A periodic pattern caused by a plurality of straight lines parallel to the pixel arrangement direction Dy along a direction parallel to the signal lines SGL is likely to appear in the display area Ad. Therefore, when the touch detection electrodes TDL are laminated in a direction orthogonal to a surface of the display area Ad, the patterns appearing in the display area Ad interfere the touch detection electrodes TDL to form a light-dark pattern, and thereby the moire pattern can be seen.

In the display device with the touch detection function 1 according to the first embodiment, the inclusion of the thin wire segments Ua satisfying the above-described first condition in the conductive thin wire ML makes the period of the light-dark pattern short enough to be invisible for the person. For example, the thin wire segments Ua according to the first embodiment extend at angles to the pixel orthogonal direction Dx and the pixel arrangement direction Dy. Satisfaction of the above-described first condition makes the angles have certain degrees or larger. This is likely to shorten the period of the light-dark pattern. As a result, in the display device with the touch detection function 1 according to the first embodiment, the inclusion of the thin wire segments Ua satisfying the above-described first condition in the conductive thin wire ML can reduce the possibility of the moire pattern being seen.

When the thin wire segment Ua satisfies the second condition in addition to the first condition, it is possible to further reduce the possibility of the moire pattern being seen because the above-described period of the light-dark pattern further shortens.

When the thin wire segment Ua satisfies the third condition in addition to the first and second conditions, it is possible to further reduce the possibility of the moire pattern being seen because the above-described period of the light-dark pattern further shortens.

When both of the thin wire segments Ua and Ub satisfy the first condition, the display device with the touch detection function 1 according to the first embodiment can reduce the possibility of the moire pattern being seen. When both of the thin wire segments Ua and Ub satisfy the second condition, the display device with the touch detection function 1 according to the first embodiment can further reduce the possibility of the moire pattern being seen. When both of the thin wire segments Ua and Ub satisfy the third condition, the display device with the touch detection function 1 according to the first embodiment can further reduce the possibility of the moire pattern being seen.

Forming the touch detection electrodes TDL and the drive electrodes COML of the electrically conductive material such as a metallic material can cause electrolytic corrosion to occur. For this reason, the display device with the touch detection function 1 according to the first embodiment has the touch detection electrodes TDL and the drive electrodes COML positioned in different planes with the glass substrate 31 interposed therebetween in a direction orthogonal to the surface of the glass substrate 31. This allows the display device with the touch detection function 1 according to the first embodiment to keep the electrolytic corrosion from occurring. The drive electrodes COML are preferably formed of a translucent material. This can reduce the possibility of the moire pattern being seen due to the interference between the touch detection electrodes TDL and the drive electrodes COML.

The drive electrodes COML is arranged on the TFT substrate 21 that faces the surface of the glass substrate 31 in the direction orthogonal thereto. When the surface of the glass substrate 31 and the drive electrodes COML are apart from each other in the direction orthogonal to the surface of the glass substrate 31, the difference between the period of the pattern appearing in the display area Ad and the period of arrangement of the drive electrodes COML changes depending on the angle of view of the person. However, arranging the drive electrodes COML on the TFT substrate 21 can reduce the change in the difference between the period of the pattern appearing in the display area Ad and the period of arrangement of the drive electrodes COML depending on the angle of view of the person. The drive electrodes COML according to the first embodiment are arranged so as to extend in the pixel arrangement direction Dy or the pixel orthogonal direction Dx described above. This makes the drive electrodes COML extend in the direction parallel to the scan lines GCL or the signal lines SGL, and thus can make reduction in an aperture ratio less likely.

1-1C. First Modification of First Embodiment

Figure 16:
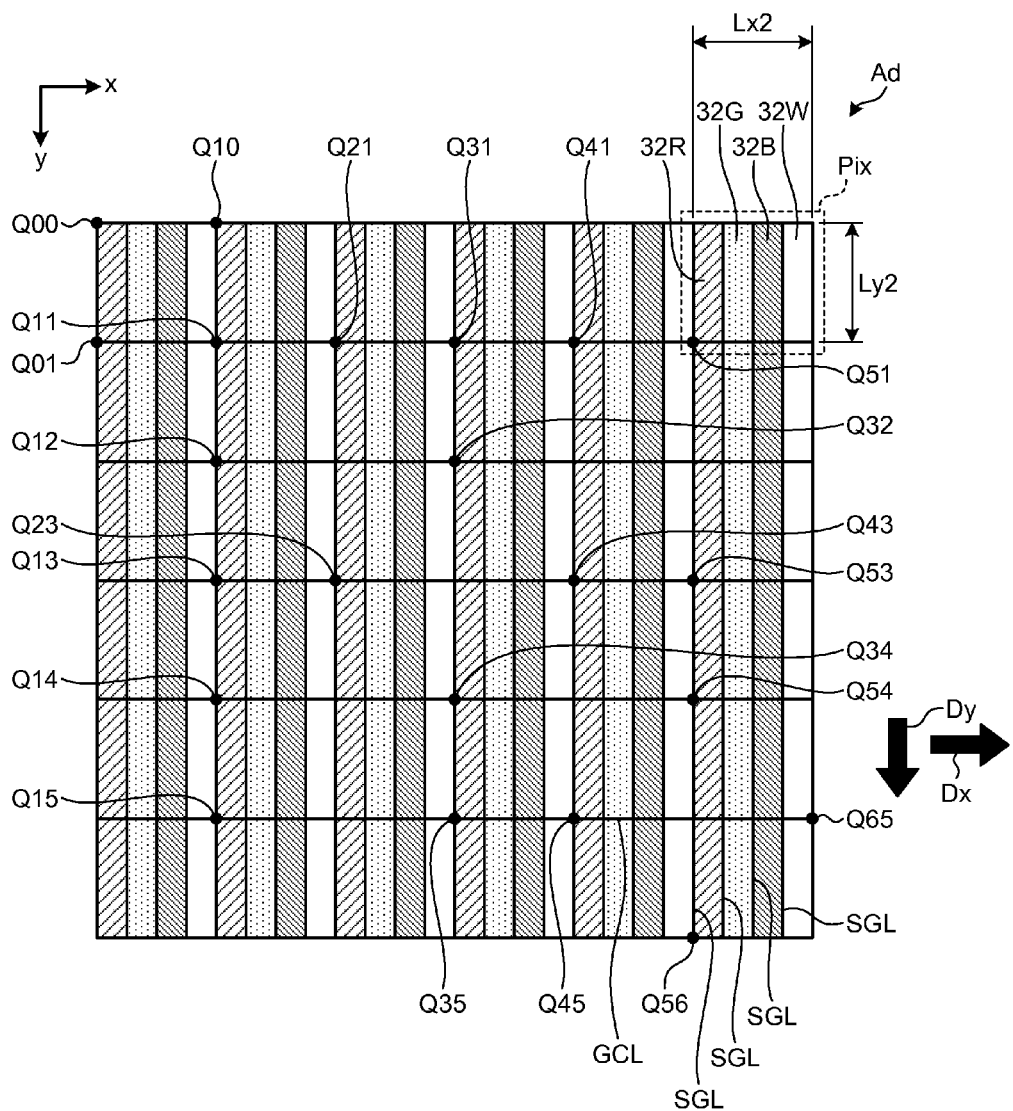
FIG. 16 is a schematic diagram explaining relative positional relations between the first end and the second end of the thin wire segment according to a first modification of the first embodiment.

FIG. 16 is a schematic diagram explaining relative positional relations between the first end and the second end of the thin wire segment according to a first modification of the first embodiment. FIG. 17 is a chart illustrating moire evaluations for evaluation examples according to the first modification of the first embodiment. The display area Ad includes a plurality of pixels Pix, each of which includes, as a set, color regions 32R, 32G, 32B, and 32W corresponding to respective subpixels SPix. The pixels Pix are arranged in a matrix along the directions parallel to the scan lines GCL and the signal lines SGL. The pixels Pix are arranged so that the respective sets of the color regions 32R, 32G, 32B, and 32W are adjacent to each other with the scan line GCL interposed therebetween.

The pixel arrangement direction Dy is a direction of arrangement of color regions having the highest human visibility. White (W) has the highest human visibility among four colors of red (R), green, (G), blue (B), and white (W). The pixel arrangement direction Dy is the direction parallel to the signal line SGL because the color regions 32W are arranged in the direction parallel to the signal line SGL in FIG. 16.

For explanation of the relative positional relations between the first end Ua1 of the thin wire segment Ua and the second end Ua2 of the thin wire segment Ua, xy coordinates are defined in FIG. 16 in which an arbitrary point among intersections between the scan lines GCL and the signal lines SGL is defined as a point of origin Q00, and the coordinates of the point of origin Q00 are represented as (0, 0). The x-axis is set in the direction parallel to the pixel orthogonal direction Dx, and the y-axis is set in the direction parallel to the pixel arrangement direction Dy. The maximum length of one of the pixels Pix in the x direction is defined as a unit length in the x direction. The maximum length of one of the pixels Pix in the y direction is defined as a unit length in the y direction. The maximum length of one of the pixels Pix in the x direction is represented as a first unit length Lx2. The maximum length of one of the pixels Pix in the y direction is represented as a second unit length Ly2.

For example, after a point moves from the point of origin Q00 by the first unit length Lx2 in the x direction, and further moves by the second unit length Ly2 in the y direction, the coordinates of the point result in (1, 1). In this xy coordinate system, a point Q01 is a point of coordinates (0, 1). A point Q15 is a point of coordinates (1, 5). A point Q14 is a point of coordinates (1, 4). A point Q13 is a point of coordinates (1, 3). A point Q12 is a point of coordinates (1, 2). A point Q35 is a point of coordinates (3, 5). A point Q23 is a point of coordinates (2, 3). A point Q34 is a point of coordinates (3, 4). A point Q45 is a point of coordinates (4, 5). A point Q56 is a point of coordinates (5, 6). A point Q11 is a point of coordinates (1, 1). A point Q65 is a point of coordinates (6, 5). A point Q54 is a point of coordinates (5, 4). A point Q43 is a point of coordinates (4, 3). A point Q32 is a point of coordinates (3, 2). A point Q53 is a point of coordinates (5, 3). A point Q21 is a point of coordinates (2, 1). A point Q31 is a point of coordinates (3, 1). A point Q41 is a point of coordinates (4, 1). A point Q51 is a point of coordinates (5, 1). A point Q10 is a point of coordinates (1, 0).

Evaluation Examples

Assuming that the first end Ua1 of the thin wire segment Ua is in the position of the point Q00, evaluations about the visibility of the moire pattern were conducted while changing the direction of positioning of the second end Ua2. The evaluation results will be described below as Evaluation Examples 22 to 42 illustrated in FIG. 17.

Evaluation Example 22

In the conductive thin wire according to Evaluation Example 22, a plurality of thin wire segments parallel to the pixel arrangement direction Dy are connected in sequence in the pixel arrangement direction Dy.

Evaluation Example 23

In the conductive thin wire according to Evaluation Example 23, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q15 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 24

In the conductive thin wire according to Evaluation Example 24, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q14 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 25

In the conductive thin wire according to Evaluation Example 25, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q13 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 26

In the conductive thin wire according to Evaluation Example 26, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q12 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 27

In the conductive thin wire according to Evaluation Example 27, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q35 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 28

In the conductive thin wire according to Evaluation Example 28, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q23 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 29

In the conductive thin wire according to Evaluation Example 29, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q34 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 30

In the conductive thin wire according to Evaluation Example 30, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q45 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 31

In the conductive thin wire according to Evaluation Example 31, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q56 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 32

In the conductive thin wire according to Evaluation Example 32, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q11 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 33

In the conductive thin wire according to Evaluation Example 33, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q65 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 34

In the conductive thin wire according to Evaluation Example 34, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q54 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 35

In the conductive thin wire according to Evaluation Example 35, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q43 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 36

In the conductive thin wire according to Evaluation Example 36, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q32 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 37

In the conductive thin wire according to Evaluation Example 37, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q53 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 38

In the conductive thin wire according to Evaluation Example 38, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q21 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 39

In the conductive thin wire according to Evaluation Example 39, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q31 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 40

In the conductive thin wire according to Evaluation Example 40, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q41 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 41

In the conductive thin wire according to Evaluation Example 41, the thin wire segments Ua and Ub are alternately connected in sequence. The thin wire segment Ua is arranged so that, when the first end Ua1 of the thin wire segment Ua is located at the point Q00, the second end Ua2 is located at a point away from the point Q00 in a direction toward the point Q51 that is a target position. The thin wire segment Ub extends in a direction different from that of extension of the thin wire segment Ua. The degree of the angle between one of the thin wire segments and the pixel arrangement direction Dy is equal to the degree of the angle between the other of the thin wire segments and the pixel arrangement direction Dy.

Evaluation Example 42

In the conductive thin wire according to Evaluation Example 42, a plurality of thin wire segments parallel to the pixel orthogonal direction Dx are connected in sequence in the pixel orthogonal direction Dx.

Evaluation

In the moire evaluation, the visibility for human eyes of the moire pattern formed by the display image of the display device with the touch detection function 1 corresponding to each of Evaluation Examples 22 to 42 was evaluated. The criterion for the moire pattern is the same as that of the first embodiment.

Evaluation Examples 27 to 31, and 33 to 37 satisfy a first condition stating as follows. The second end Ua2 of the thin wire segment Ua is located at a point away from the first end Ua1 in the direction toward the target position. The target position is distant from the first end Ua1 in the pixel orthogonal direction Dx by an integral multiple of the first unit length Lx2, a value of which is two or larger, and is distant from the first end Ua1 in the pixel arrangement direction Dy by an integral multiple of the second unit length Ly2, a value of which is two or larger. The value of the integral multiple of the first unit length Lx2 differs from the value of the integral multiple of the second unit length Ly2. In other words, the first condition is as follows. The second end Ua2 of the thin wire segment Ua is arranged away from the first end Ua1 in the direction toward the target position. The target position is distant from the first end Ua1 in the pixel orthogonal direction Dx by N times of the first unit length Lx2, and is distant from the first end Ua1 in the pixel arrangement direction Dy by M times of the second unit length Ly2. Each of N and M is an integer of 2 or larger. N and M are different from each other.

The moire evaluation is rated as any one of A, B, or B in any of Evaluation Examples 27 to 31, and 33 to 37. Thus, the visibility of the moire pattern is suppressed.

Evaluation Examples 27, 29 to 31, 33 to 35, and 37 satisfy a second condition. The second condition is that the values of the integral multiples of the first and the second unit lengths Lx2 and Ly2 have a value of three or larger. In other words, the second condition is that each of N and M is an integer of 3 or larger. The moire evaluation of any of Evaluation Examples 27, 29 to 31, 33 to 35, and 37 is rated as A or B. Thus, the visibility of the moire pattern is further suppressed.

Evaluation Examples 29 to 31, and 33 to 35 satisfy a third condition. The third condition is that the difference between the values of the integral multiples of the first and the second unit lengths Lx2 and Ly2 is one. In other words, the third condition is that a difference between N and M is 1. The moire evaluation of any of Evaluation Examples 29 to 31, and 33 to 35 is rated as A. Thus, the visibility of the moire pattern is further suppressed.

Advantages

In the display device with the touch detection function 1 according to the first modification of the first embodiment, the inclusion of the thin wire segments Ua satisfying the above-described first condition in the conductive thin wire ML makes the period of the light-dark pattern short enough to be invisible for the person. For example, the thin wire segments Ua according to the first modification of the first embodiment extend at angles to the pixel orthogonal direction Dx and the pixel arrangement direction Dy. Satisfaction of the above-described first condition makes the angles have certain degrees or larger. This is likely to shorten the period of the light-dark pattern. As a result, in the display device with the touch detection function 1 according to the first modification of the first embodiment, the inclusion of the thin wire segments Ua satisfying the above-described first condition in the conductive thin wire ML can reduce the possibility of the moire pattern being seen.

When the thin wire segment Ua satisfies the second condition in addition to the first condition, it is possible to further reduce the possibility of the moire pattern being seen because the above-described period of the light-dark pattern further shortens.

When the thin wire segment Ua satisfies the third condition in addition to the first and second conditions, it is possible to further reduce the possibility of the moire pattern being seen because the above-described period of the light-dark pattern is further reduced.

When both of the thin wire segments Ua and Ub satisfy the first condition, the display device with the touch detection function 1 according to the first modification of the first embodiment can reduce the possibility of the moire pattern being seen. When both of the thin wire segments Ua and Ub satisfy the second condition, the display device with the touch detection function 1 according to the first modification of the first embodiment can further reduce the possibility of the moire pattern being seen. When both of the thin wire segments Ua and Ub satisfy the third condition, the display device with the touch detection function 1 according to the first modification of the first embodiment can further reduce the possibility of the moire pattern being seen.

1-1D. Second Modification of First Embodiment

Figure 18:
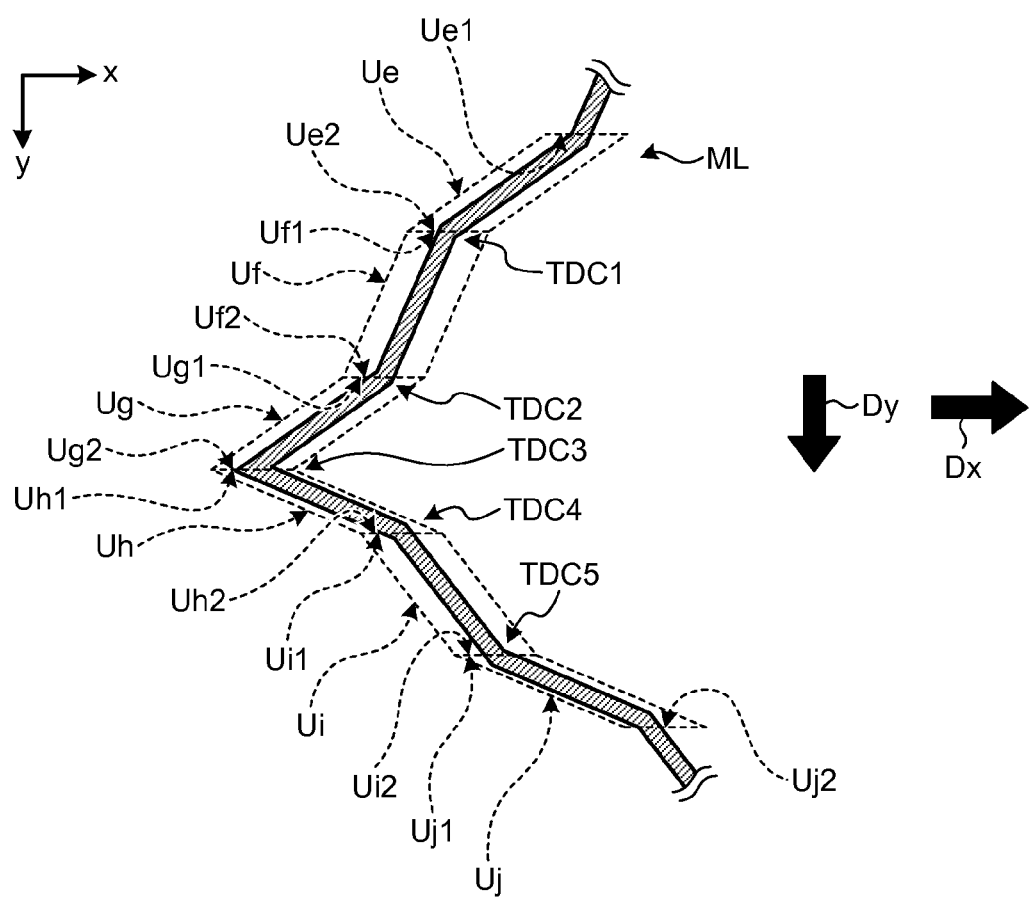
FIG. 18 is a schematic diagram for explaining a configuration of a touch detection electrode according to a second modification of the first embodiment.

FIG. 18 is a schematic diagram for explaining a configuration of a touch detection electrode TDL according to a second modification of the first embodiment. The thin wire segments Ua and Ub in the first embodiment extend toward the same direction in the pixel orthogonal direction Dx from the bent portion TDC serving as the connecting portion between the second end Ua2 of the thin wire segment Ua and the first end Ub1 of the thin wire segment Ub. The second modification of the first embodiment includes portions in which the thin wire segments adjacent to each other at the bent portion TDC extend toward different directions in the pixel orthogonal direction Dx from the bent portion TDC.

FIG. 18 is an enlarged diagram of a portion of a conductive thin wire ML according the second modification of the first embodiment. The conductive thin wire ML includes portions at which thin wire segments Ue, Uf, Ug, Uh, Ui, and Uj are connected together.

A second end Ue2 of the thin wire segment Ue and a first end Uf1 of the thin wire segment Uf are connected to each other, and thus the thin wire segments Ue and Uf are conductive with each other. The portion at which the second end Ue2 of the thin wire segment Ue and the first end Uf1 of the thin wire segment Uf are connected to each other serves as a bent portion TDC1. The thin wire segments Ue and Uf extend toward different directions in the pixel orthogonal direction Dx from the bent portion TDC1.

A second end Uf2 of the thin wire segment Uf and a first end Ug1 of the thin wire segment Ug are connected to each other, and thus the thin wire segments Uf and Ug are conductive with each other. The portion at which the second end Uf2 of the thin wire segment Uf and the first end Ug1 of the thin wire segment Ug are connected to each other serves as a bent portion TDC2. The thin wire segments Uf and Ug extend toward different directions in the pixel orthogonal direction Dx from the bent portion TDC2.

A second end Ug2 of the thin wire segment Ug and a first end Uh1 of the thin wire segment Uh are connected to each other, and thus the thin wire segments Ug and Uh are conductive with each other. The portion at which the second end Ug2 of the thin wire segment Ug and the first end Uh1 of the thin wire segment Uh are connected to each other serves as a bent portion TDC3. The thin wire segments Ug and Uh extend toward the same direction in the pixel orthogonal direction Dx from the bent portion TDC3.

A second end Uh2 of the thin wire segment Uh and a first end Ui1 of the thin wire segment Ui are connected to each other, and thus the thin wire segments Uh and Ui are conductive with each other. The portion at which the second end Uh2 of the thin wire segment Uh and the first end Ui1 of the thin wire segment Ui are connected to each other serves as a bent portion TDC4. The thin wire segments Uh and Ui extend toward different directions in the pixel orthogonal direction Dx from the bent portion TDC4.

A second end Ui2 of the thin wire segment Ui and a first end Uj1 of the thin wire segment Uj are connected to each other, and thus the thin wire segments Ui and Uj are conductive with each other. The portion at which the second end Ui2 of the thin wire segment Ui and the first end Uj1 of the thin wire segment Uj are connected to each other serves as a bent portion TDC5. The thin wire segments Ui and Uj extend toward different directions in the pixel orthogonal direction Dx from the bent portion TDC5.

Advantages

In the display device with the touch detection function 1 according to the second modification of the first embodiment, the inclusion of at least one of the thin wire segments Ue, Uf, Ug, Uh, Ui, and Uj satisfying the first condition stated in the first embodiment can reduce the possibility of the moire pattern being seen. This is because variation in the above-described period of the light-dark pattern among areas including the respective thin wire segments Ue, Uf, Ug, Uh, Ui, and Uj obscures the period of the light-dark pattern to the extent of being invisible for the person.

The thin wire segments Ue, Uf, Ug, Uh, Ui, and Uj according to the second modification of the first embodiment extend at angles to the pixel orthogonal direction Dx and the pixel arrangement direction Dy. When some of the thin wire segments Ue, Uf, Ug, Uh, Ui, and Uj according to the second modification of the first embodiment satisfy the first condition, the angles thereof have certain degrees or larger, so that the period of the light-dark pattern shortens. When all of the thin wire segments Ue, Uf, Ug, Uh, Ui, and Uj according to the second modification of the first embodiment satisfy the first condition, the angles thereof have certain degrees or larger, so that the period of the light-dark pattern further shortens. When the thin wire segments Ue, Uf, Ug, Uh, Ui, and Uj satisfy the second condition in addition to the first condition, it is possible to further reduce the possibility of the moire pattern being seen because the above-described period of the light-dark pattern further shortens.

When the thin wire segments Ue, Uf, Ug, Uh, Ui, and Uj satisfy the third condition in addition to the first and second conditions, it is possible to further reduce the possibility of the moire pattern being seen because the above-described period of the light-dark pattern further shortens.

1-2. Second Embodiment

Figure 19:
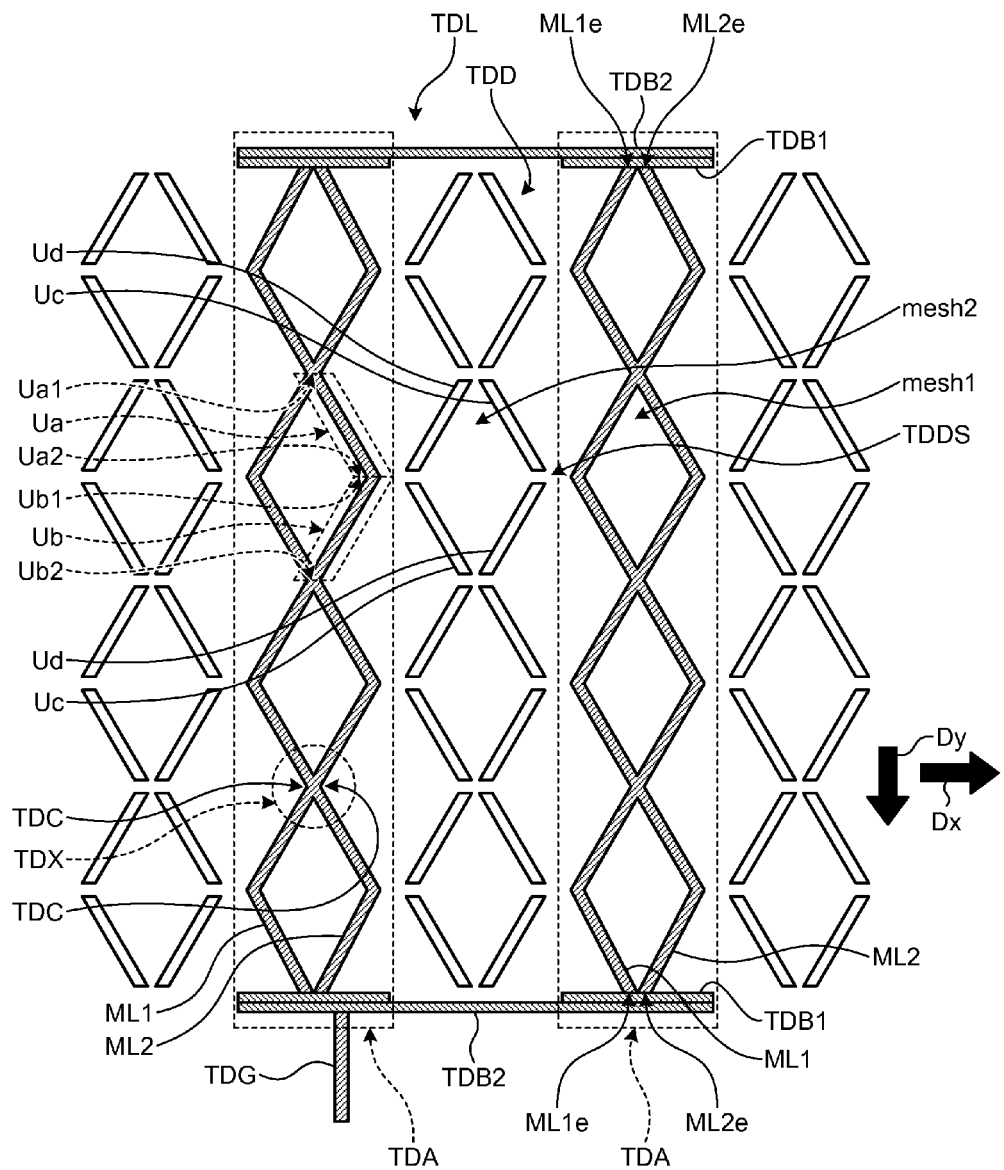
FIG. 19 is a schematic diagram illustrating an arrangement of touch detection electrodes according to a second embodiment.

A display device with a touch detection function 1 according to a second embodiment of the present disclosure will be described below. FIG. 19 is a schematic diagram illustrating an arrangement of touch detection electrodes TDL according to the second embodiment. The same constituent elements as those described in the first embodiment above will be given the same numerals, and duplicate description thereof will be omitted.

As illustrated in FIG. 19, each of the touch detection electrodes TDL according to the second embodiment includes a conductive thin wire ML1 and a conductive thin wire ML2 extending in a pixel arrangement direction Dy in the plane parallel to the counter substrate 3. A set of the conductive thin wires ML1 and ML2 form the detection area TDA. Ends ML1e of the conductive thin wire ML1 and corresponding ends ML2e of the conductive thin wire ML2 are connected to be conductive with each other via the corresponding first conductive portion TDB1.

The conductive thin wire ML1 corresponds to the conductive thin wire ML illustrated in the first embodiment. The conductive thin wire ML2 has a shape axisymmetric to the conductive thin wire ML1 with respect to a straight line parallel to the pixel arrangement direction Dy as an axis of symmetry. The conductive thin wire ML2 is formed of the same material as that of the conductive thin wire ML1. The conductive thin wire ML2 is arranged so as to form intersections TDX at which the bent portions TDC of the conductive thin wire ML1 are connected with the bent portions TDC of the conductive thin wire ML2. The conductive thin wires ML1 and ML2 are conductive with each other at the intersections TDX. This leads the conductive thin wires ML1 and ML2 to form surrounded areas mesh1 surrounded by the thin wire segments Ua and Ub. The conductive thin wires ML1 and ML2 need not be connected at the bent portions TDC. The conductive thin wires ML1 and ML2 may be connected to be conductive with each other, for example, between intermediate portions of the thin wire segments Ua in the conductive thin wire ML1 and intermediate portions of the thin wire segments Ub in the conductive thin wire ML2, respectively.

The dummy electrode TDD includes the thin wire segments Uc and Ud. The thin wire segments Uc are arranged parallel to the thin wire segments Ua, and the thin wire segments Ud are arranged parallel to the thin wire segments Ub. The thin wire segments Uc and Ud are arranged so that a surrounded area mesh2 surrounded by two of the thin wire segments Uc and two of the thin wire segments Ud has the same area as that of each of the surrounded areas mesh1. This reduces the difference in the level of the light-shielding effect between the areas arranged with the touch detection electrodes TDL and the areas not arranged therewith, and thus can reduce the possibility of the touch detection electrode TDL being likely to be seen.

Advantages

If one of the conductive thin wires ML1 and ML2 becomes partly thinner and unreliable in conductivity in the display device with the touch detection function 1 according to the second embodiment, the above-described configuration can increase probability of the touch detection by coupling the conductive thin wire to the other conductive thin wire at the intersections TDX.

1-3. Third Embodiment

Figure 20:
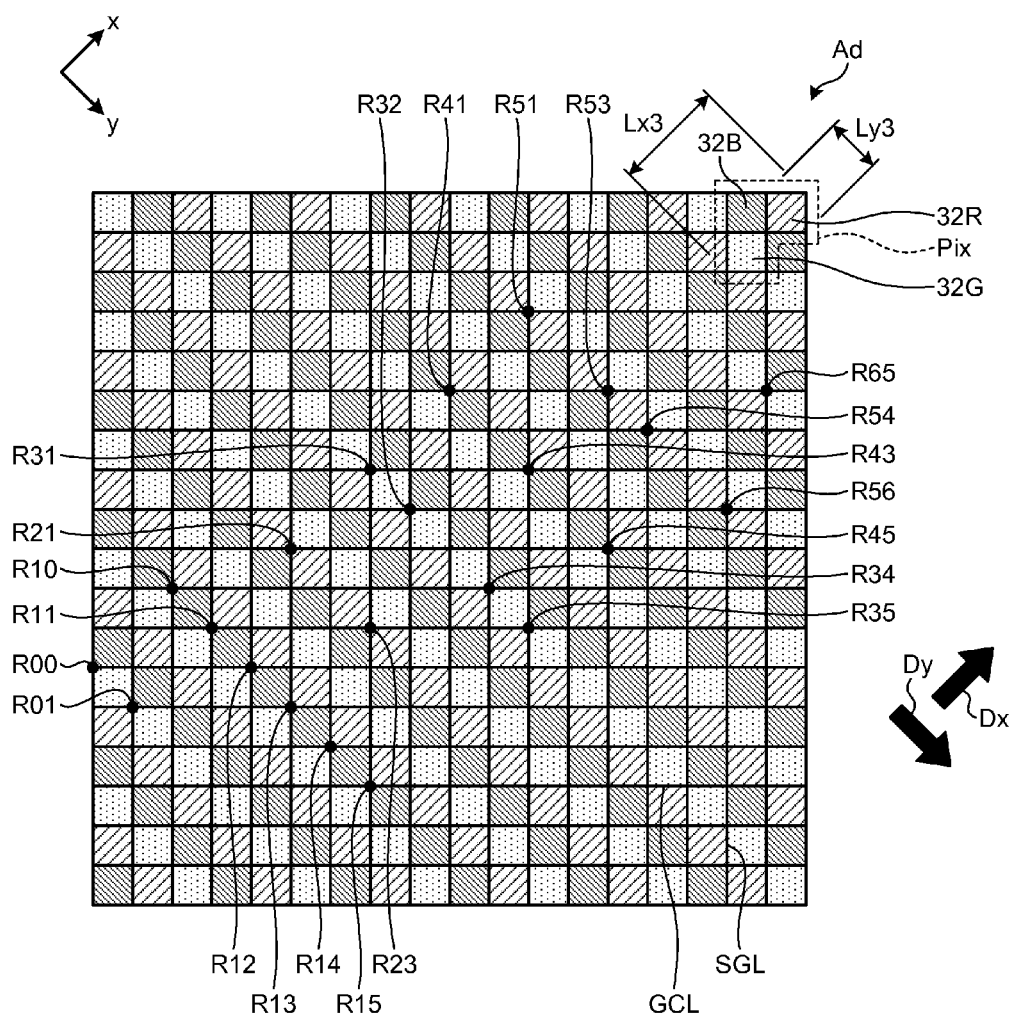
FIG. 20 is a schematic diagram explaining relative positional relations between a first end and a second end of a thin wire segment according to a third embodiment.

A display device with a touch detection function 1 according to a third embodiment will be described below. FIG. 20 is a schematic diagram explaining relative positional relations between the first end and the second end of the thin wire segment according to the third embodiment. The same constituent elements as those described in the first embodiment above will be given the same numerals, and duplicate description thereof will be omitted.

The color regions 32R, 32G, and 32B correspond to the respective sub-pixels SPix, and constitute each of the pixels Pix as a set. As illustrated in FIG. 20, the pixels Pix are arranged in a matrix along the directions parallel to the scan lines GCL and the signal lines SGL. The pixels Pix are arranged so that the color regions having the same color are adjacent to each other neither in the direction parallel to the scan lines GCL nor in the direction parallel to the signal lines SGL.

The pixel arrangement direction Dy is a direction of arrangement of color regions having the highest human visibility. Green (G) has the highest human visibility among the three colors of red (R), green, (G), and blue (B). Because the color regions 32G are arranged in a diagonal direction of each of the color regions 32G in FIG. 20, the pixel arrangement direction Dy in the third embodiment is in the diagonal direction of the color region 32G.

For explanation of the relative positional relations between the first and the second ends Ua1 and Ua2 of the thin wire segment Ua, xy coordinates are defined in FIG. 20 in which an arbitrary point among intersections between the scan lines GCL and the signal lines SGL is defined as a point of origin R00, and the coordinates of the point of origin R00 are represented as (0, 0). The x-axis is set in the direction parallel to the pixel orthogonal direction Dx, and the y-axis is set in the direction parallel to the pixel arrangement direction Dy. The maximum length of one of the pixels Pix in the x direction is defined as a unit length in the x direction. The maximum length of one of the pixels Pix in the y direction is defined as a unit length in the y direction. The maximum length of one of the pixels Pix in the x direction is represented as a first unit length Lx3. The maximum length of one of the pixels Pix in the y direction is represented as a second unit length Ly3.

For example, after a point moves from the point of origin R00 by the first unit length Lx3 in the x direction, and further moves by the second unit length Ly3 in the y direction, the coordinates of the point result in (1, 1). In this xy coordinate system, a point R01 is a point of coordinates (0, 1). A point R15 is a point of coordinates (1, 5). A point R14 is a point of coordinates (1, 4). A point R13 is a point of coordinates (1, 3). A point R12 is a point of coordinates (1, 2). A point R35 is a point of coordinates (3, 5). A point R23 is a point of coordinates (2, 3). A point R34 is a point of coordinates (3, 4). A point R45 is a point of coordinates (4, 5). A point R56 is a point of coordinates (5, 6). A point R11 is a point of coordinates (1, 1). A point R65 is a point of coordinates (6, 5). A point R54 is a point of coordinates (5, 4). A point R43 is a point of coordinates (4, 3). A point R32 is a point of coordinates (3, 2). A point R53 is a point of coordinates (5, 3). A point R21 is a point of coordinates (2, 1). A point R31 is a point of coordinates (3, 1). A point R41 is a point of coordinates (4, 1). A point R51 is a point of coordinates (5, 1). A point R10 is a point of coordinates (1, 0).

Advantages

In the third embodiment, the thin wire segment Ua illustrated in FIG. 13 or 19 satisfies the first condition in the following case. The case is such that, when the first end Ua1 of the thin wire segment Ua is positioned at the point R00, the second end Ua2 is located at a point away from the point R00 in the direction toward a target position, and the target position is any one of the points R35, R23, R34, R45, R56, R65, R54, R43, R32, and R53. Satisfaction of the first condition by the thin wire segment Ua can reduce the possibility of the moire pattern being seen.

In the third embodiment, the thin wire segment Ua illustrated in FIG. 13 or 19 satisfies the first and the second conditions in the following case. The case is such that, when the first end Ua1 of the thin wire segment Ua is positioned at the point R00, the second end Ua2 is located at a point away from the point R00 in the direction toward a target position, and the target position is any one of the points R35, R34, R45, R56, R65, R54, R43, and R53. Satisfaction of the first and the second conditions by the thin wire segment Ua can further reduce the possibility of the moire pattern being seen.

In the third embodiment, the thin wire segment Ua illustrated in FIG. 13 or 19 satisfies the first, the second, and the third conditions in the following case. The case is such that, when the first end Ua1 of the thin wire segment Ua is positioned at the point R00, the second end Ua2 is located at a point away from the point R00 in the direction toward a target position, and the target position is any one of the points R34, R45, R56, R65, R54, and R43. Satisfaction of the first, the second, and the third conditions by the thin wire segment Ua can further reduce the possibility of the moire pattern being seen.

Satisfaction of the first condition by both of the thin wire segments Ua and Ub illustrated in FIG. 13 or 19 can also reduce the possibility of the moire pattern being seen. Satisfaction of the second condition by both of the thin wire segments Ua and Ub can further reduce the possibility of the moire pattern being seen. Satisfaction of the third condition by both of the thin wire segments Ua and Ub can further reduce the possibility of the moire pattern being seen.

1-4. Fourth Embodiment

Figure 21:
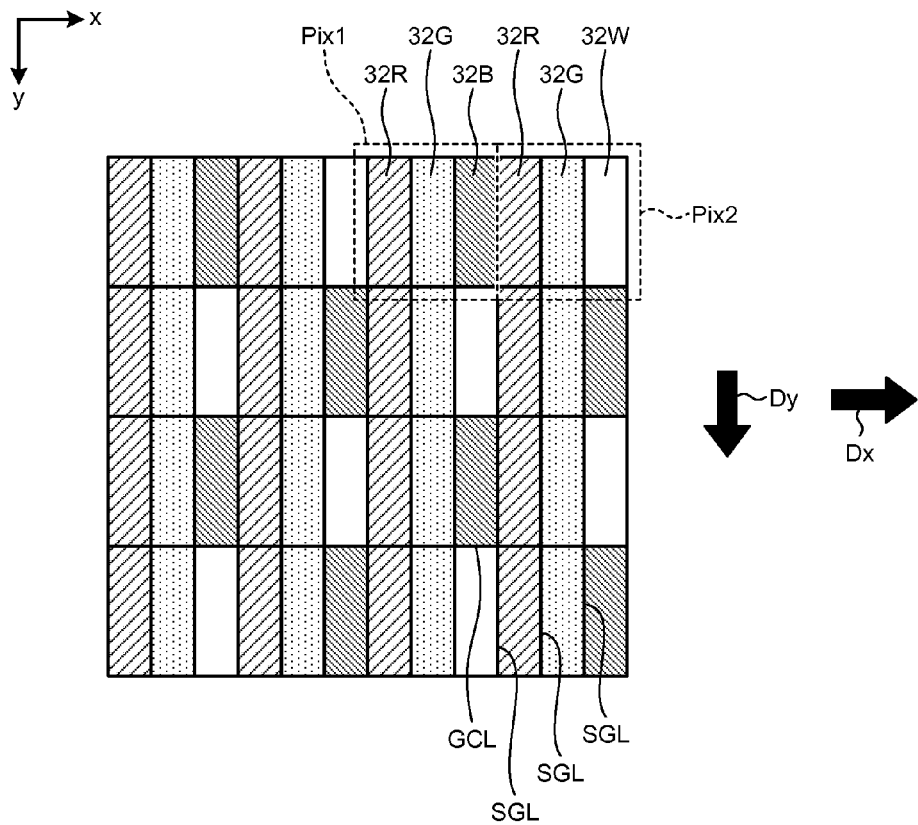
FIG. 21 is a schematic diagram for explaining a pixel arrangement direction according to a fourth embodiment.

A display device with a touch detection function 1 according to a fourth embodiment of the present disclosure will be described below. FIG. 21 is a schematic diagram for explaining the pixel arrangement direction Dy according to the fourth embodiment. The same constituent elements as those described in the first embodiment above will be given the same numerals, and duplicate description thereof will be omitted.

Color regions 32R, 32G, 32B, and 32W of four colors of red (R), green, (G), blue (B), and white (W) correspond to the respective sub-pixels SPix. A set of color regions 32R, 32G, and 32B and a set of color regions 32R, 32G, and 32W constitute respective pixels Pix. The pixel Pix constituted by the color regions 32R, 32G, and 32B is represented as a pixel Pix1, and the pixel Pix constituted by the color regions 32R, 32G, and 32W is represented as a pixel Pix2. As illustrated in FIG. 21, the pixels Pix are arranged in a matrix along the directions parallel to the scan lines GCL and the signal lines SGL. The pixels Pix1 and Pix2 are arranged so that the pixels Pix1 are not adjacent to each other and the pixels Pix2 are not adjacent to each other in either of the direction parallel to the scan lines GCL or the direction parallel to the signal lines SGL.

The pixel arrangement direction Dy is a direction of arrangement of color regions having the highest human visibility. White (W) has the highest human visibility among the four colors of red (R), green, (G), blue (B), and white (W). However, none of the color regions 32W are adjacent to each other, so that no direction of arrangement thereof is available. In this case, a direction of arrangement of color regions having the second highest human visibility serves as the pixel arrangement direction Dy. Green (G) has the highest human visibility among the three colors of red (R), green, (G), and blue (B), excluding white (W). The pixel arrangement direction Dy is the direction parallel to the signal line SGL because the color regions 32G are arranged in the direction parallel to the signal line SGL in FIG. 21.

1-5. Fifth Embodiment

Figure 22:
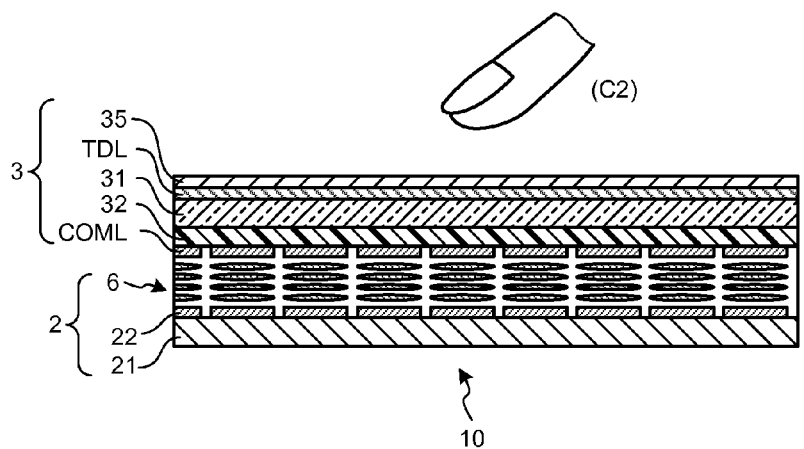
FIG. 22 is a cross-sectional view illustrating a schematic cross-sectional structure of a display unit with a touch detection function according to a fifth embodiment.

FIG. 22 is a cross-sectional view illustrating a schematic cross-sectional structure of a display unit with a touch detection function according to a fifth embodiment. In the display device with the touch detection function 1 according to any of the embodiments and the modifications thereof described above, the liquid crystal display unit 20 using the liquid crystals of one of the various modes, such as the FFS mode and the IPS mode, can be integrated with the touch detection device 30 to provide the display unit with the touch detection function 10. A display unit with a touch detection function 10 according to the fifth embodiment illustrated in FIG. 22 may instead be provided by integrating the touch detection device with liquid crystals of one of various modes, such as a twisted nematic (TN) mode, a vertical alignment (VA) mode, and an electrically controlled birefringence (ECB) mode.

2. Application Examples

With reference to FIGS. 23 to 35, a description will be made below of application examples of the display device with the touch detection function 1 described in any one of the first to fifth embodiments and the modifications thereof. FIGS. 23 to 35 are diagrams each illustrating an example of an electronic apparatus to which the display device with the touch detection function or the display device according to any of the above-mentioned embodiments and modifications thereof is applied. The display device with the touch detection function 1 or the display device according to any of the above-mentioned embodiments and the modifications thereof can be applied to electronic apparatuses in all fields, such as television devices, digital cameras, laptop computers, portable electronic apparatuses including mobile phones, and video cameras. In other words, the display device with the touch detection function 1 or the display device according to any of the above-described embodiments and the modifications thereof can be applied to electronic apparatuses in all fields that display externally received video signals or internally generated video signals as images or video pictures.

Application Example 1

Figure 23:
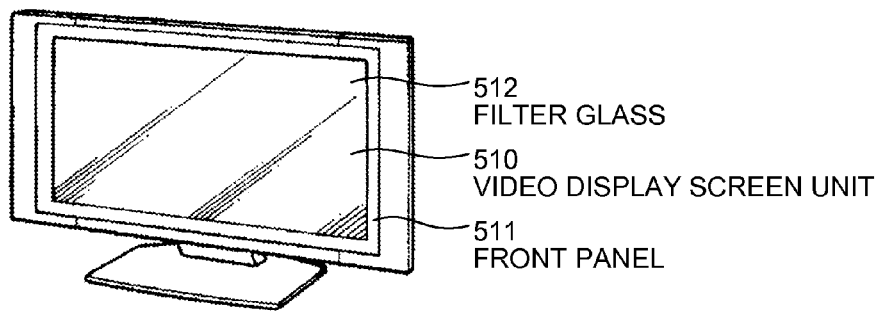
FIG. 23 is a diagram illustrating an example of an electronic apparatus to which the display device with the touch detection function or the display device according to any of the above-mentioned embodiments and modifications is applied.

The electronic apparatus illustrated in FIG. 23 is a television device to which the display device with the touch detection function 1 or the display device according to any of the first to fifth embodiments and the modifications thereof is applied. This television device includes, for example, a video display screen unit 510 that includes a front panel 511 and a filter glass 512. The video display screen unit 510 corresponds to the display device with the touch detection function 1 or the display device according to any of the first to fifth embodiments and the modifications thereof.

Application Example 2

Figure 24:
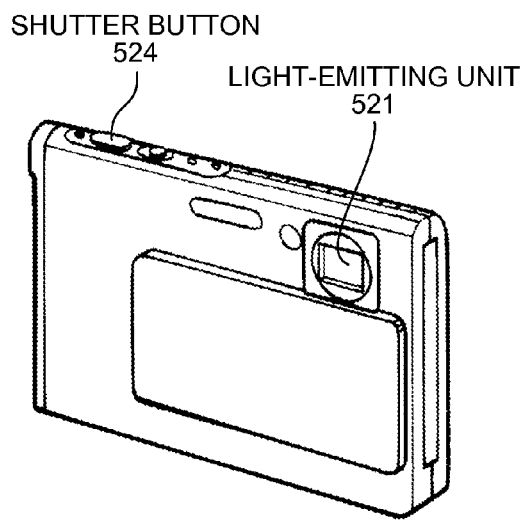
FIG. 24 is a diagram illustrating an example of an electronic apparatus to which the display device with the touch detection function or the display device according to any of the above-mentioned embodiments and modifications is applied.
Figure 25:
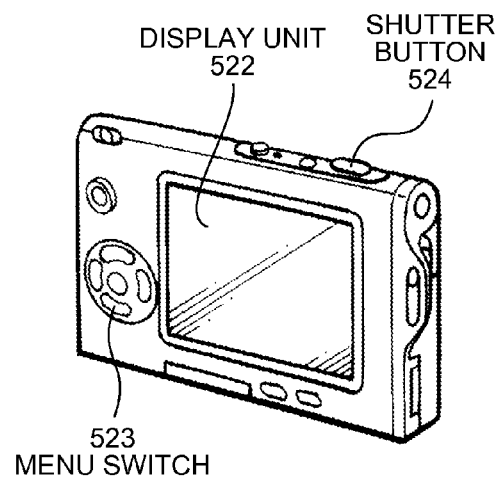
FIG. 25 is a diagram illustrating the example of the electronic apparatus to which the display device with the touch detection function or the display device according to any of the above-mentioned embodiments and modifications is applied.

The electronic apparatus illustrated in FIGS. 24 and 25 is a digital camera to which the display device with the touch detection function 1 or the display device according to any of the first to fifth embodiments and the modifications thereof is applied. This digital camera includes, for example, a light-emitting unit 521 for flash, a display unit 522, a menu switch 523, and a shutter button 524. The display unit 522 corresponds to the display device with the touch detection function 1 or the display device according to any of the first to fifth embodiments and the modifications thereof.

Application Example 3

Figure 26:
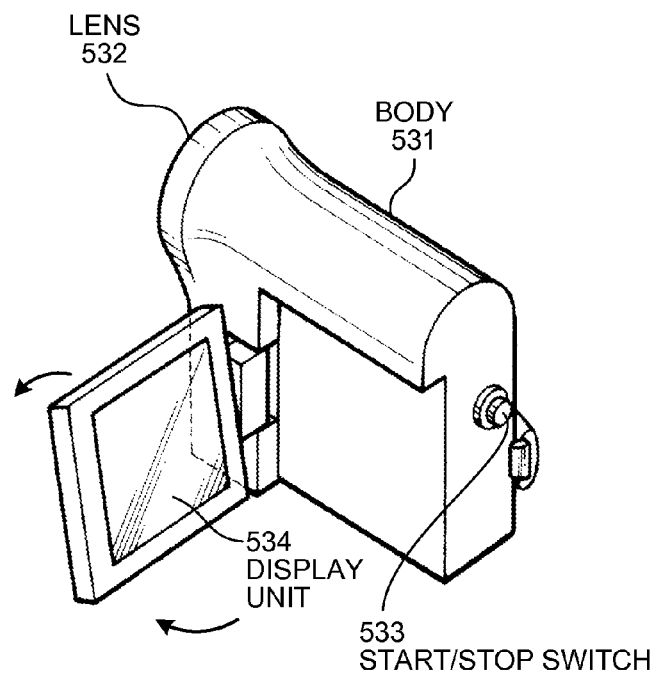
FIG. 26 is a diagram illustrating an example of an electronic apparatus to which the display device with the touch detection function or the display device according to any of the above-mentioned embodiments and modifications is applied.

The electronic apparatus illustrated in FIG. 26 represents an external appearance of a video camera to which the display device with the touch detection function 1 or the display device according to any of the first to fifth embodiments and the modifications thereof is applied. This video camera includes, for example, a body 531, a lens 532 for photographing a subject provided on the front side face of the body 531, and a start/stop switch 533 for photographing, and a display unit 534. The display unit 534 corresponds to the display device with the touch detection function 1 or the display device according to any of the first to fifth embodiments and the modifications thereof.

Application Example 4

Figure 27:
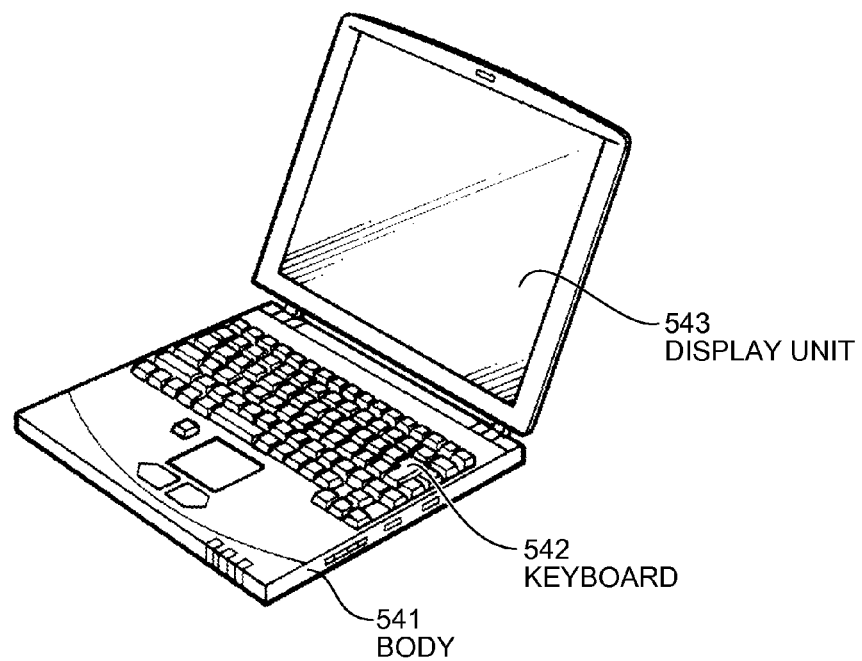
FIG. 27 is a diagram illustrating an example of an electronic apparatus to which the display device with the touch detection function or the display device according to any of the above-mentioned embodiments and modifications is applied.
Figure 28:
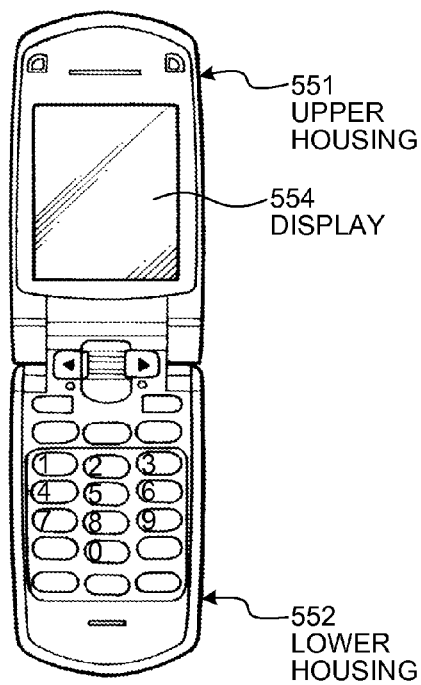
FIG. 28 is a diagram illustrating an example of an electronic apparatus to which the display device with the touch detection function or the display device according to any of the above-mentioned embodiments and modifications is applied.
Figure 29:
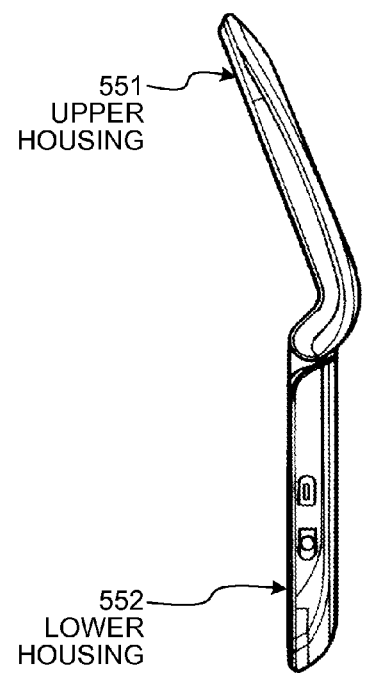
FIG. 29 is a diagram illustrating the example of the electronic apparatus to which the display device with the touch detection function or the display device according to any of the above-mentioned embodiments and modifications is applied.
Figure 30:
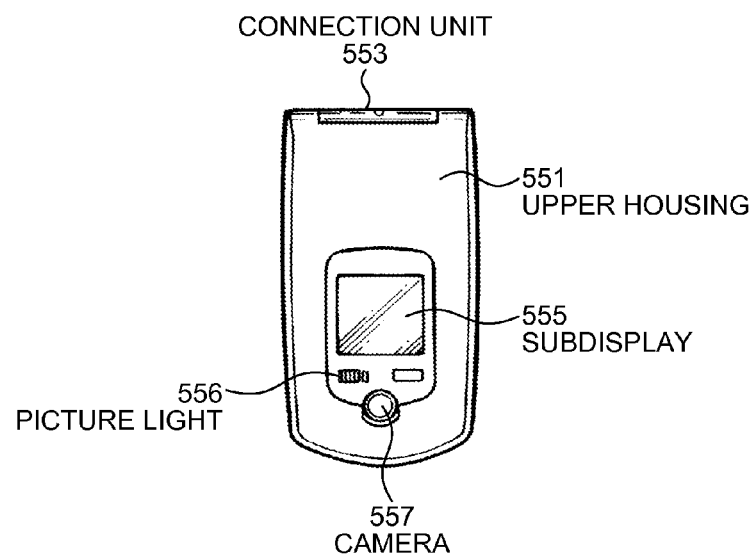
FIG. 30 is a diagram illustrating the example of the electronic apparatus to which the display device with the touch detection function or the display device according to any of the above-mentioned embodiments and modifications is applied.
Figure 31:
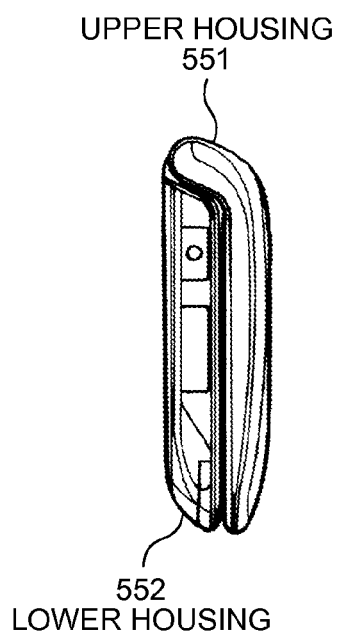
FIG. 31 is a diagram illustrating the example of the electronic apparatus to which the display device with the touch detection function or the display device according to any of the above-mentioned embodiments and modifications is applied.
Figure 32:
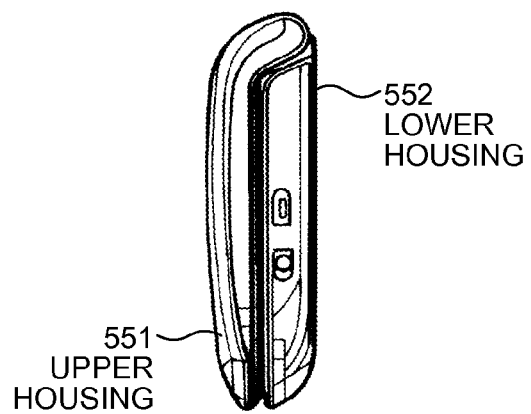
FIG. 32 is a diagram illustrating the example of the electronic apparatus to which the display device with the touch detection function or the display device according to any of the above-mentioned embodiments and modifications is applied.
Figure 33:
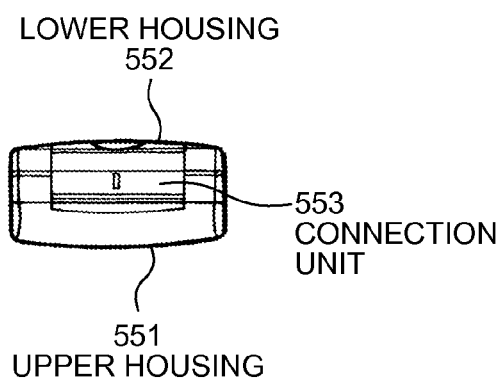
FIG. 33 is a diagram illustrating the example of the electronic apparatus to which the display device with the touch detection function or the display device according to any of the above-mentioned embodiments and modifications is applied.
Figure 34:
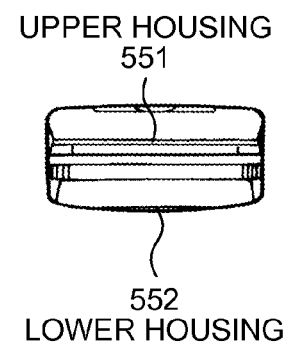
FIG. 34 is a diagram illustrating the example of the electronic apparatus to which the display device with the touch detection function or the display device according to any of the above-mentioned embodiments and modifications is applied.

The electronic apparatus illustrated in FIG. 27 is a laptop computer to which the display device with the touch detection function 1 or the display device according to any of the first to fifth embodiments and the modifications thereof is applied. This laptop computer includes, for example, a body 541, a keyboard 542 for input operation of characters, for example, and a display unit 543 that displays images. The display unit 543 corresponds to the display device with the touch detection function 1 or the display device according to any of the first to fifth embodiments and the modifications thereof.

Application Example 5

The electronic apparatus illustrated in FIGS. 28 to 35 is a mobile phone to which the display device with the touch detection function 1 or the display device according to any of the first to fifth embodiments and the modifications thereof is applied. This mobile phone is, for example, composed of an upper housing 551 and a lower housing 552 connected to each other by a connection unit (hinge unit) 553, and includes a display 554, a subdisplay 555, a picture light 556, and a camera 557. The display 554 and/or the subdisplay 555 correspond(s) to the display device with the touch detection function 1 or the display device according to any of the first to fifth embodiments and the modifications thereof.

Application Example 6

Figure 35:
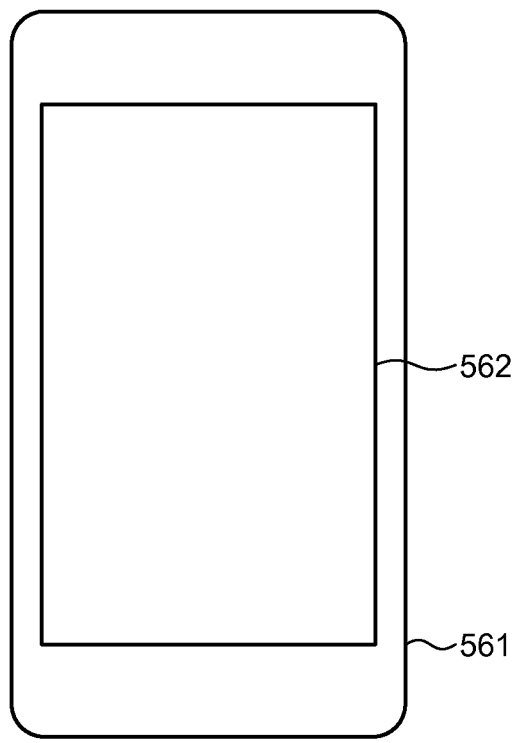
FIG. 35 is a diagram illustrating the example of an electronic apparatus to which the display device with the touch detection function or the display device according to any of the above-mentioned embodiments and modifications is applied.

The electronic apparatus illustrated in FIG. 35 is a portable information terminal that operates as a portable computer, a multifunctional mobile phone, a portable computer with voice call capability, or a portable computer with communication capability, and that is sometimes called a smartphone or a tablet computer. This portable information terminal includes, for example, a display unit 562 on a surface of a housing 561. The display unit 562 corresponds to the display device with the touch detection function 1 or the display device according to any of the first to fifth embodiments and the modifications thereof.

3. Aspects of Present Disclosure

The present disclosure includes the following aspects.
(1) A display device with a touch detection function comprising:
  a substrate;
  a display area in which pixels each constituted by a plurality of color regions are arranged in a matrix in a plane parallel to a surface of the substrate;
  a touch detection electrode that includes a conductive thin wire extending in a plane parallel to the surface of the substrate, the conductive thin wire including a plurality of thin wire segments each having a linear shape and including a first end and a second end, the second end of one of adjacent thin wire segments and the first end of the other of the adjacent thin wire segments being connected to each other;
  a drive electrode that has electrostatic capacitance with respect to the touch detection electrode; and
  a display function layer having a function of displaying an image in the display area, wherein
  when it is assumed that a direction of arrangement of color regions having the highest human visibility among the color regions is defined as a pixel arrangement direction, that a maximum length of one of the pixels in a pixel orthogonal direction orthogonal to the pixel arrangement direction in the plane parallel to the surface of the substrate is defined as a first unit length, and that a maximum length of one of the pixels in a direction parallel to the pixel arrangement direction is defined as a second unit length,
  the plurality of thin wire segments included in the conductive thin wire includes a thin wire segment extending in a direction different from the pixel arrangement direction, and the second end of the thin wire segment is located at a place away from the first end in a direction toward a target position, where the target position is distant from the first end of the thin wire segment in the pixel orthogonal direction by N times of the first unit length, and is distant from the first end of the thin wire segment in the pixel arrangement direction by M times of the second unit length, each of N and M is an integer of 2 or larger, and N and M are different from each other.
(2) The display device with the touch detection function according to (1), wherein each of N and M is an integer of 3 or larger.
(3) The display device with the touch detection function according to (2), wherein a difference between N and M is 1.
(4) The display device with the touch detection function according to (1), wherein in the adjacent thin wire segments, a portion at which the second end of one of the adjacent thin wire segments is connected to the first end of the other of the thin wire segments forms a bent portion, from which the one of the adjacent thin wire segments extends at an angle with respect to the pixel arrangement direction, and the other of the adjacent thin wire segments extends in a direction different from that of the one of the adjacent thin wire segments so as to change the angle with respect to the pixel arrangement direction at the bent portion.
(5) The display device with the touch detection function according to (1), wherein
  a plurality of such conductive thin wires are arranged in the plane parallel to the surface of the substrate and are arranged so as to form an intersecting portion where the thin wire segments of the conductive thin wires adjacent to each other intersect, and
  one of the adjacent conductive thin wires is connected to the thin wire segments of the other of the adjacent conductive thin wires at the intersecting portion.
(6) The display device with the touch detection function according to (1), wherein
  the touch detection electrode and the drive electrode are arranged in different planes with the substrate interposed therebetween in a direction orthogonal to the surface of the substrate; and
  the drive electrode is translucent.
(7) The display device with the touch detection function according to (6), wherein the drive electrode extends in the pixel arrangement direction or the pixel orthogonal direction.
(8) An electronic apparatus comprising:
  a display device with a touch detection function that comprises:
    a substrate;
    a display area in which pixels each constituted by a plurality of color regions are arranged in a matrix in a plane parallel to a surface of the substrate;
    a touch detection electrode that includes a conductive thin wire extending in a plane parallel to the surface of the substrate, the conductive thin wire including a plurality of thin wire segments each having a linear shape and including a first end and a second end, the second end of one of adjacent thin wire segments and the first end of the other of the adjacent thin wire segments being connected to each other;
    a drive electrode that has electrostatic capacitance with respect to the touch detection electrode; and
    a display function layer having a function of displaying an image in the display area, wherein
    when it is assumed that a direction of arrangement of color regions having the highest human visibility among the color regions is defined as a pixel arrangement direction, that a maximum length of one of the pixels in a pixel orthogonal direction orthogonal to the pixel arrangement direction in the plane parallel to the surface of the substrate is defined as a first unit length, and that a maximum length of one of the pixels in a direction parallel to the pixel arrangement direction is defined as a second unit length,
    the plurality of thin wire segments included in the conductive thin wire includes a thin wire segment extending in a direction different from the pixel arrangement direction, and the second end of the thin wire segment is located at a place away from the first end in a direction toward a target position, where the target position is distant from the first end of the thin wire segment in the pixel orthogonal direction by N times of the first unit length, and is distant from the first end of the thin wire segment in the pixel arrangement direction by M times of the second unit length, each of N and M is an integer of 2 or larger, and N and M are different from each other.

A display device with a touch detection function and an electronic apparatus of the present disclosure can reduce the possibility of a moire pattern being seen, while including touch detection electrodes of an electrically conductive material such as a metallic material.

An electronic apparatus of the present disclosure includes the above-described display device with a touch detection function. Examples of the electronic apparatus of the present disclosure include, but are not limited to, a television device, a digital camera, a personal computer, a video camera, and a portable electronic apparatus such as a mobile phone.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising:
   a substrate;
   a display area in which pixels each constituted by a plurality of color regions are arranged in a matrix in a plane parallel to a surface of the substrate;
   a touch detection electrode that includes a conductive thin wire extending in a plane parallel to the surface of the substrate, the conductive thin wire including a plurality of thin wire segments each having a linear shape and including a first end and a second end, the second end of one of adjacent thin wire segments and the first end of the other of the adjacent thin wire segments being connected to each other;
   a drive electrode that has electrostatic capacitance with respect to the touch detection electrode; and
   a display function layer having a function of displaying an image in the display area, wherein
   when it is assumed that a direction of arrangement of color regions having the highest human visibility among the color regions is defined as a pixel arrangement direction, that a maximum length of one of the pixels in a pixel orthogonal direction orthogonal to the pixel arrangement direction in the plane parallel to the surface of the substrate is defined as a first unit length, and that a maximum length of one of the pixels in a direction parallel to the pixel arrangement direction is defined as a second unit length,
   the plurality of thin wire segments included in the conductive thin wire include a thin wire segment extending in a direction different from the pixel arrangement direction, and the second end of the thin wire segment is located at a place away from the first end in a direction toward a target position, where the target position is distant from the first end of the thin wire segment in the pixel orthogonal direction by N times of the first unit length, and is distant from the first end of the thin wire segment in the pixel arrangement direction by M times of the second unit length, each of N and M is an integer of 2 or larger, and N and M are different from each other.

2. The display device with the touch detection function according to claim 1, wherein each of N and M is an integer of 3 or larger.

3. The display device with the touch detection function according to claim 2, wherein a difference between N and M is 1.

4. The display device with the touch detection function according to claim 1, wherein in the adjacent thin wire segments, a portion at which the second end of one of the adjacent thin wire segments is connected to the first end of the other of the thin wire segments forms a bent portion, from which the one of the adjacent thin wire segments extends at an angle with respect to the pixel arrangement direction, and the other of the adjacent thin wire segments extends in a direction different from that of the one of the adjacent thin wire segments so as to change the angle with respect to the pixel arrangement direction at the bent portion.

5. The display device with the touch detection function according to claim 1, wherein
   a plurality of such conductive thin wires are arranged in the plane parallel to the surface of the substrate and are arranged so as to form an intersecting portion where the thin wire segments of the conductive thin wires adjacent to each other intersect, and
   one of the adjacent conductive thin wires is connected to the thin wire segments of the other of the adjacent conductive thin wires at the intersecting portion.

6. The display device with the touch detection function according to claim 1, wherein
   the touch detection electrode and the drive electrode are arranged in different planes with the substrate interposed therebetween in a direction orthogonal to the surface of the substrate; and
   the drive electrode is translucent.

7. The display device with the touch detection function according to claim 6, wherein the drive electrode extends in the pixel arrangement direction or the pixel orthogonal direction.

8. An electronic apparatus comprising:
   a display device with a touch detection function that comprises:
   a substrate;
   a display area in which pixels each constituted by a plurality of color regions are arranged in a matrix in a plane parallel to a surface of the substrate;
   a touch detection electrode that includes a conductive thin wire extending in a plane parallel to the surface of the substrate, the conductive thin wire including a plurality of thin wire segments each having a linear shape and including a first end and a second end, the second end of one of adjacent thin wire segments and the first end of the other of the adjacent thin wire segments being connected to each other;
   a drive electrode that has electrostatic capacitance with respect to the touch detection electrode; and
   a display function layer having a function of displaying an image in the display area, wherein
   when it is assumed that a direction of arrangement of color regions having the highest human visibility among the color regions is defined as a pixel arrangement direction, that a maximum length of one of the pixels in a pixel orthogonal direction orthogonal to the pixel arrangement direction in the plane parallel to the surface of the substrate is defined as a first unit length, and that a maximum length of one of the pixels in a direction parallel to the pixel arrangement direction is defined as a second unit length,
   the plurality of thin wire segments included in the conductive thin wire include a thin wire segment extending in a direction different from the pixel arrangement direction, and the second end of the thin wire segment is located at a place away from the first end in a direction toward a target position, where the target position is distant from the first end of the thin wire segment in the pixel orthogonal direction by N times of the first unit length, and is distant from the first end of the thin wire segment in the pixel arrangement direction by M times of the second unit length, each of N and M is an integer of 2 or larger, and N and M are different from each other.

* * * * *